United States Patent
Donolo

(10) Patent No.: US 10,063,124 B2
(45) Date of Patent: Aug. 28, 2018

(54) SHAFT MOUNTED MONITOR FOR ROTATING MACHINERY

(71) Applicant: Schweitzer Engineering Laboratories, Inc., Pullman, WA (US)

(72) Inventor: Marcos A. Donolo, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 15/372,209

(22) Filed: Dec. 7, 2016

(65) Prior Publication Data

US 2017/0170773 A1    Jun. 15, 2017

Related U.S. Application Data

(60) Provisional application No. 62/265,834, filed on Dec. 10, 2015.

(51) Int. Cl.
| | |
|---|---|
| H02P 7/00 | (2016.01) |
| H02K 11/25 | (2016.01) |
| H02K 11/21 | (2016.01) |
| H02K 11/24 | (2016.01) |
| G05B 19/4062 | (2006.01) |
| H02K 11/35 | (2016.01) |
| H02P 29/66 | (2016.01) |

(52) U.S. Cl.
CPC ......... *H02K 11/25* (2016.01); *G05B 19/4062* (2013.01); *H02K 11/21* (2016.01); *H02K 11/24* (2016.01); *H02K 11/35* (2016.01); *H02P 29/66* (2016.02)

(58) Field of Classification Search
CPC . H02P 1/26; H02P 23/14; G06F 19/00; H02H 23/14
USPC ................................................. 318/432–434
See application file for complete search history.

(56) References Cited

U.S. PATENT DOCUMENTS

| | | | |
|---|---|---|---|
| 3,921,047 A | 11/1975 | Carter | |
| 4,142,591 A | 3/1979 | Himmelstein | |

(Continued)

FOREIGN PATENT DOCUMENTS

| | | |
|---|---|---|
| WO | 2008116966 | 10/2008 |
| WO | 2011076263 | 6/2011 |
| WO | 2016037711 | 3/2016 |

OTHER PUBLICATIONS

Benouzza, N., Benyettou, A., Bendiabdellah, A., An Advanced Park's Vectors Approach for Rotor Cage Diagnosis, IEEE First International Symposium on Control, Communications and Signal Processing, Mar. 21-24, 2004.

(Continued)

*Primary Examiner* — Rina Duda
(74) *Attorney, Agent, or Firm* — Jared L. Cherry; Richard M. Edge

(57) ABSTRACT

Disclosed herein is a shaft-mounted monitor for monitoring conditions of a rotating shaft using a calculated rotational component of the rotating shaft. The monitor may include a sensor such as an accelerometer, thermal sensor, strain gauge, or the like. In various embodiments, a variety of parameters relating to the rotating shaft may be monitored, such as a temperature, rotational speed, angular position, torque, power, frequency, or the like. The monitor may include a wireless transmitter to transmit the monitored condition of the rotating shaft to an intelligent electronic device or a monitoring system.

20 Claims, 14 Drawing Sheets

(56) References Cited

U.S. PATENT DOCUMENTS

| | | | |
|---|---|---|---|
| 4,218,718 A | 8/1980 | Sun | |
| 4,228,396 A | 10/1980 | Palombo | |
| 4,229,694 A | 10/1980 | Wilson | |
| 4,450,403 A | 5/1984 | Dreiseitl | |
| 4,463,306 A | 7/1984 | de Mello | |
| 4,506,339 A | 3/1985 | Kuhnlein | |
| 4,761,703 A | 8/1988 | Kliman | |
| 4,766,370 A | 8/1988 | Carr | |
| 4,991,429 A | 2/1991 | Stacey | |
| 5,030,917 A | 7/1991 | Kliman | |
| 5,418,442 A * | 5/1995 | Araki | G01P 3/44 318/651 |
| 5,537,322 A | 7/1996 | Denz | |
| 5,541,488 A | 7/1996 | Bansal | |
| 5,548,197 A * | 8/1996 | Unsworth | G01P 3/48 318/729 |
| 5,793,750 A | 8/1998 | Schweitzer | |
| 6,172,509 B1 | 1/2001 | Cash | |
| 6,245,066 B1 | 6/2001 | Morgan | |
| 6,308,140 B1 | 10/2001 | Dowling | |
| 6,456,946 B1 | 9/2002 | O'Gorman | |
| 6,476,521 B1 | 11/2002 | Lof | |
| 6,642,700 B2 | 11/2003 | Slade | |
| 6,662,124 B2 | 12/2003 | Schweitzer | |
| 6,845,333 B2 | 1/2005 | Anderson | |
| 6,873,931 B1 | 3/2005 | Nower | |
| 6,934,654 B2 | 8/2005 | Benmouyal | |
| 6,947,264 B2 | 9/2005 | Gill | |
| 6,947,269 B2 | 9/2005 | Lee | |
| 7,285,949 B2 | 10/2007 | Bruns | |
| 7,336,455 B2 | 2/2008 | Dimino | |
| 8,092,174 B2 * | 1/2012 | Egedal | F03D 17/00 416/18 |
| 8,248,060 B2 | 8/2012 | Schweitzer | |
| 8,248,061 B2 | 8/2012 | Schweitzer | |
| 8,674,683 B2 | 3/2014 | Schweitzer, III | |
| 8,725,451 B2 | 5/2014 | Whitefield | |
| 8,792,217 B2 * | 7/2014 | Shah | H02H 7/261 361/20 |
| 8,912,792 B2 | 12/2014 | Seeley | |
| 9,151,802 B2 | 10/2015 | Donolo | |
| 9,176,024 B2 | 11/2015 | Jensen | |
| 2002/0033052 A1 | 3/2002 | Kondo | |
| 2004/0156152 A1 | 8/2004 | Kalender | |
| 2005/0212548 A1 | 9/2005 | Kim | |
| 2006/0100819 A1 | 5/2006 | Grant | |
| 2007/0035398 A1 | 2/2007 | Vesel | |
| 2009/0089608 A1 | 4/2009 | Guzman-Casillas | |
| 2009/0091303 A1 | 4/2009 | Schweitzer, III | |
| 2010/0126274 A1 * | 5/2010 | Lin | G01P 15/18 73/514.29 |
| 2010/0301792 A1 | 12/2010 | Tiwari | |
| 2010/0320763 A1 | 12/2010 | Li | |
| 2011/0231171 A1 | 9/2011 | Jousselin | |
| 2011/0240628 A1 | 10/2011 | Goretti | |
| 2011/0260042 A1 | 10/2011 | Schweitzer, III | |
| 2012/0265457 A1 * | 10/2012 | Donolo | G01R 31/343 702/58 |
| 2012/0313490 A1 | 12/2012 | Schweitzer, III | |
| 2014/0055126 A1 * | 2/2014 | Seeley | H02P 9/02 324/207.2 |
| 2014/0191591 A1 * | 7/2014 | Kasztenny | H01H 47/00 307/141 |
| 2014/0368956 A1 | 12/2014 | Perra | |
| 2015/0311849 A1 | 10/2015 | Zhang | |
| 2016/0334468 A1 | 11/2016 | Patel | |

OTHER PUBLICATIONS

Cardoso, A.J.M., and Saraiva E.S., Computer-Aided Detection of Airgap Eccentricity in Operating Three-Phase Induction Motors by Park's Vector Approach, IEEE Transactions on Industry Applications, vol. 29, Issue 5, Sep./Oct. 1993.

Didier, G., Ternisien, E., Caspary, O., Razik H., Fault Detection of Broken Rotor Bars in Induction Motor using a Global Fault Index, IEEE Transactions on Industry Applications, vol. 42, Issue 1, Jan. 30, 2006.

Douglas, H., Pillay, P., Ziarani, A., Detection of Broken Rotor Bars in Induction Motors Using Wavelet Analysis, IEEE International Electric Machines and Drives Conference, Jun. 2003.

Stankovic, Dragen, et al., Enhanced Algorithm for Motor Rotor Broken Bar Detection, IEEE Industrial and Commercial Power Systems Technical Conference, May 9-13, 2010.

Kliman, G.B., et al, Noninvasive Detection of Broken Rotor Bars in Operating Induction Motors, IEEE Transactions on Energy Conversion, vol. 3, No. 4, Dec. 1988.

Cardoso, A.J.M., Cruz, S.M.A., Carvalho, J.F.S., Saraiva, E.S., Rotor Cage Fault Diagnosis in Three-Phase Induction Motors, by Park's Vector Approach, IEEE Industry Applications Conference, Oct. 1999.

Cruz, S.M.A., Cardoso, A.J.M., Stator Winding Fault Diagnosis in Three-Phase Synchronous and Asynchronous Motors, by the Extended Park's Vector Approach, IEEE Transactions on Industry Applications, vol. 37, No. 5, Sep./Oct. 2001.

Williamson, S., and Smith, A.C., Steady-State Analysis of 3-Phase Cage Motors with Rotor-Bar and End-Ring Faults, IEE Proc. vol. 129, Pt.B, No. 3, May 1982.

Borim, Thiago Leite, et al., Benefits of Monitoring the Rotor Electrical Quantities and Transmitting by Wireless Communication, Presented at IEEE 2015 Petroleum and Chemical Industry Conference, Oct. 2015.

Arebi, Lufti, Gu, J., Ball, Andrew and Gu, Fengshou (2010) Investigation of a Rotating Shaft with a Novel Integrated Wireless Accelerometer. In: The Seventh International Conference on Condition Monitoring and Machinery Failure Prevention Technologies, Jun. 22-24, 2010, Ettington Chase, Stratford-upon-Avon, England, UK.

Benbouzid et al., What Stator Current Processing-Based Technique to Use for Induction Motor Rotor Faults Diagnosis?, Jun. 2003, IEEE Transactions on Energy Conversion, vol. 18, No. 2.

Benbouzid et al., A Review of Induction Motors Signature Analysis as a Medium for Faults Detection, Oct. 2000, IEEE Transactions on Industrial Electronics, vol. 47, No. 5.

Didier et al., A New Approach to Detect Broken Rotor Bars in Induction Machines by Current Spectrum Analysis, Apr. 25, 2006, Mechanical Systems and Signal Processing 21 (2007), p. 1127-1142.

R.L. Nailen, Power Plant Electrical Reference Series, vol. 6, Motors (1987), pp. 128-131.

ABB MACHsense-R—Remote Condition Monitoring Service Installation and Comissioning Manual, 2012.

Hesler, Steve: Wireless Sensor Technology Measures Torsional Shaft Vibration in Turbine Generators, Jan. 1, 2016.

Demetrios A. Tziouvaras, Daqing Hou, Schweitzer Engineering Laboratories, Inc., Out-Of-Step Protection Fundamentals and Advancements, Jan. 1, 2003.

GMM, Optical Pick-Up (OPU) Specifications & Hook-Up, Oct. 3, 1995.

Encoder Design Guide, Optical Encoder Design and Operation, Nov. 11, 2004.

Optical Encoder Design and Operation, Apr. 1, 2005.

Patent Cooperation Treaty, International Search Report PCT/2008/079228, dated Dec. 8, 2008.

Patent Coperation Treaty, Written Opinion of the International Searching Authority PCT/2008/079228, dated Dec. 8, 2008.

Stephen Petronio, Optical Rotary Encoder Basics, Design News for Mechanical and Design Engineers, Apr. 22, 2002.

Zhou Jie, Zhang Daonong, Yu Yuehai, Wu Jingtao, Zhou Ji, Bi Tianshu, Xiong Ming, Rotor Position Measurement Method for Generator Power Angles, 2011 The International Conference on Advanced Power System Automation and Protection, Oct. 16, 2011.

PCT/US2013/056271, Patent Cooperation Treaty, International Search Report and Written Opinion of the International Searching Authority, dated Feb. 10, 2014.

\* cited by examiner

SHAFT MOUNTED MONITOR FOR ROTATING MACHINERY

RELATED APPLICATION

The present application claims priority under 35 U.S.C. § 119(e) to U.S. Provisional Patent Application No. 62/265,834, filed Dec. 10, 2015, and titled "Shaft-Mounted Monitor for Monitoring Rotating Machinery," which is incorporated herein by reference in its entirety.

TECHNICAL FIELD

This disclosure relates to the monitoring of rotating machinery. More particularly, this disclosure relates to monitoring various characteristics of a rotating machine using a shaft-mounted monitor that includes sensors for obtaining a variety of readings.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
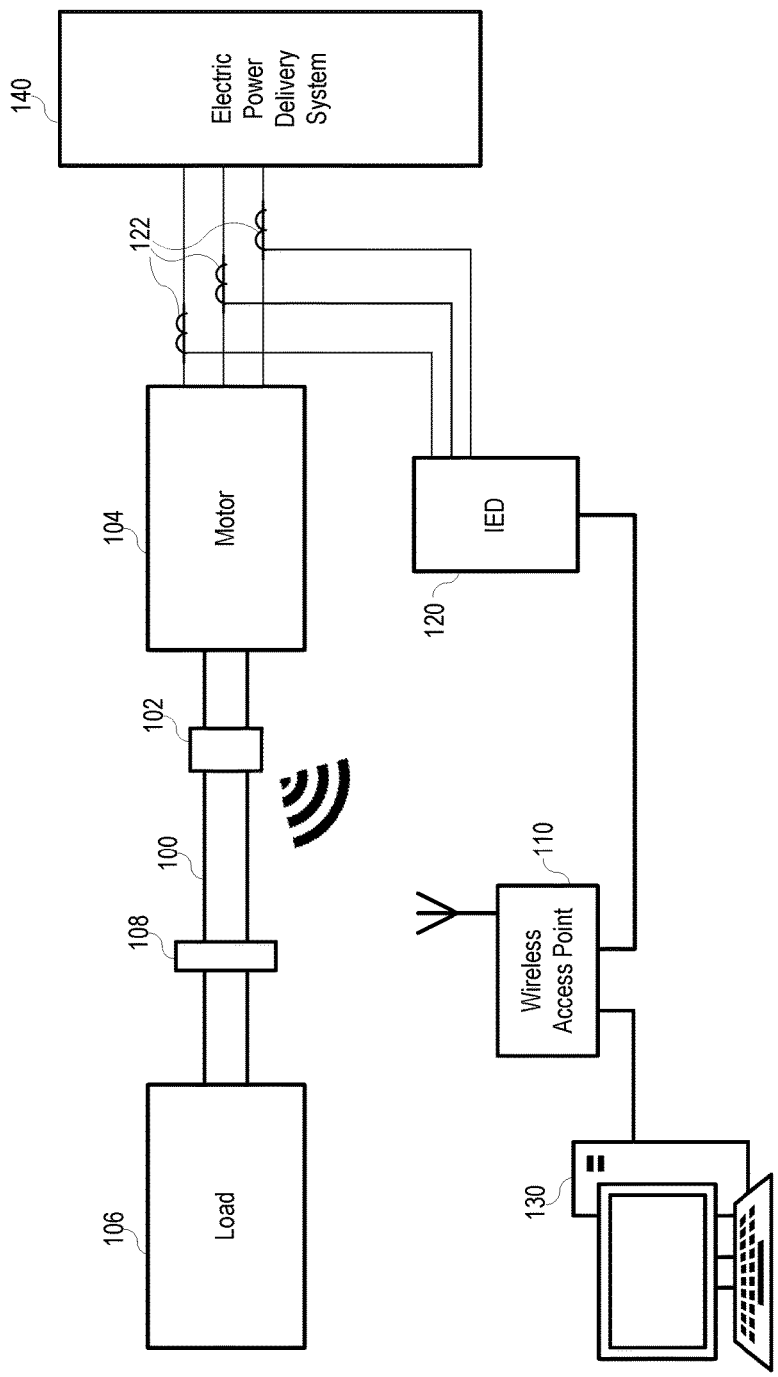
FIG. 1 illustrates a simplified block diagram of a system including a shaft-mounted system configured to monitor rotating machinery consistent with various embodiments of the present disclosure.

Several different types of rotating machinery are used throughout industry and utilities. For example, electric power may be generated by rotating a rotor in a stator using a prime mover connected to the rotor by a rotating shaft. Motors use electric power to produce mechanical power delivered by a rotating shaft. It has been estimated that around 45% of the electric power generated globally is used by electric motors. Monitoring and maintenance of electric power generators and electric motors may help to prolong the lifetimes of the equipment, make more efficient use of such rotating machinery, and maintain the stability of electric power systems.

Intelligent electronic devices ("IEDs") are often used to monitor and control electric power generators, electric motors, and other components in electric power systems. IEDs may be distinct or separate from the rotating machinery, and may receive electrical signals inputs from electric power generators and electric motors such as, for example, signals from the electric power provided to a motor, signals from the electric power produced by a generator, signals from rotors and/or stator of motors or generators, and the like. IEDs may monitor such equipment using the electrical signals. IEDs may also receive inputs from other sensors to monitor such rotating equipment. For example, a speed switch may be used to output a signal that a shaft is rotating. A rotation monitor may be used to output a signal related to a rotational speed and/or position of a rotating shaft. Rotation monitors typically may utilize an encoder mounted to the rotating shaft and a reader (such as an optical reader) configured to read the encoder. Such rotation monitors are bound in accuracy by the granularity of the pattern of the shaft-mounted encoder and may require a specialized reader. Such encoders may be specifically configured for the particular shaft (e.g. size and clearance) to be monitored. Further, the encoder must be carefully aligned with the reader. Rotation of a rotating shaft may also be monitored using a toothed wheel apparatus mounted to the rotating shaft. Rotation of the toothed wheel mounted to the rotating shaft may be monitored using a reader. As with the system of an encoder and reader, the toothed wheel system may be particularly designed for the rotating shaft and may require alignment of the reader with the toothed wheel.

Disclosed herein are apparatuses and systems for monitoring a rotating shaft using a shaft-mounted monitor. The apparatuses and systems may calculate a rotational speed of the rotating shaft and/or an angular position of the rotating shaft. The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor-executable instructions.

FIG. 1 illustrates a simplified block diagram of a system configured to monitor a motor consistent with various embodiments of the present disclosure. The system includes a motor 104 providing mechanical power to a load 106 using a rotating shaft 100. In some embodiments, the motor 104 may be a combustion engine or other type of engine that is configured to generate mechanical power through shaft 100 to load 106. The shaft may include one or more couplers 108. The motor 104 may be configured to receive electric power from an electric power delivery system 140 and to convert the electrical power to mechanical power delivered using the rotating shaft 100 to load 106. In some embodiments, the motor 104 may be a three-phase motor, receiving three phases of electric power from the electric power delivery system 140. In other embodiments, the electric motor 104 may be a single-phase motor, a direct current motor, etc.

IED 120 is configured to monitor and protect the motor 104. IED 120 may receive measurements using, for example, current transformers (CTs) 122 to monitor electrical current to the motor 104. In other embodiments, potential transformers (PTs) (not shown) may be used monitor voltage. The IED 120 may be configured to disconnect power to the electric motor 104 under certain conditions. For example, during startup, if the IED 120 detects that the motor is receiving electric power but is not turning, (i.e., the shaft is connected to "locked rotor"), the IED 120 may be configured to disconnect electric power to the motor 104 by, for example, signaling a circuit breaker (not separately illustrated) to open. Still further, the rotation information may be utilized to determine an anomalous speed condition (i.e., an over-speed condition or an under-speed condition). Appropriate action may then be taken to remedy the anomalous speed condition by increasing or decreasing the speed of rotation, as appropriate, or by selectively disconnecting electric power to the motor 104.

Many operating conditions of the electric motor 104 may be monitored using the current and/or voltage signals from the electric power supplied to the motor 104 including, for example locked rotor conditions, overcurrent, arc flash, abnormal thermal conditions, broken bar, efficiency, and the like. The detection of such conditions may also be performed using a shaft-mounted system consistent with the present embodiments.

IED 120 may include various inputs for accepting signals related to the operation of the electric motor 104. For example, IED 120 may be configured to directly monitor a temperature, and thus may include an input for receiving a signal related to a temperature. A signal related to the temperature may be provided by a thermocouple in proximity with the equipment to be monitored and in electrical communication with the IED 120 to provide the signal thereto. The IED 120 may include an input for receiving a signal related to the rotational speed and/or angular position of the rotating shaft 100 as described above, such may be from a speed switch, encoder/reader, toothed wheel and reader, or the like.

In the illustrated embodiment, a signal corresponding with the rotation of the rotating shaft may be provided to a wireless access point 110 in wireless communication with a shaft-mounted monitor 102. In some embodiments, the wireless access point 110 may utilize commercially available wireless communication technologies, including 802.11, Bluetooth, Wireless USB, etc. The shaft-mounted monitor 102 may be configured to provide a signal wirelessly to the wireless access point 110 related to the rotation of shaft 100. As will be described in more detail below, the shaft-mounted monitor 102 may include a sensor, a power supply, and a wireless transmitter to wirelessly provide a signal related to the monitoring of the rotating shaft. For example, one example of a sensor that may be used in the shaft-mounted monitor 102 may be an accelerometer for measuring an acceleration of the shaft. The acceleration may be related to a radial acceleration of the rotating shaft, a tangential acceleration of the rotating shaft or the like. The acceleration may be related to an acceleration due to gravity. The acceleration may be related to a combination of a radial and/or tangential acceleration from the rotation of the rotating shaft and an acceleration due to gravity. The shaft-mounted monitor 102 may be configured to wirelessly transmit one or more signals related to the monitoring of the rotating machinery to the wireless access point 110.

In certain embodiments, information regarding vibration of the shaft 100 may also be detected and/or monitored by the shaft-mounted monitor 102. Variations in the amplitude of the acceleration waveform signal may represent vibrations of the rotating shaft 100. Frequency analysis of the acceleration waveform signal may be utilized in various embodiments to identify a variety of issues. For example, vibrations may be representative bearing problems, broken bar, shaft misalignments, load oscillations, gear problems, and the like. Such information may be utilized to identify potential repair or maintenance issues associated with either load 106 or motor 104.

The wireless access point 110 may be in communication with the IED 120 to provide the one or more signals from the shaft-mounted sensor 102 to the IED 120. The IED 120 may then calculate certain rotational components of the rotating shaft from the one or more signals from the shaft-mounted monitor. For example, the IED 120 may be configured to calculate a rotational speed of the rotating shaft 100 using a signal related to the acceleration from the shaft-mounted monitor 102 due to the rotation of the rotating shaft 100 and a distance from the center of the rotating shaft to the shaft-mounted monitor. In another embodiment, the IED 120 may be configured to calculate an angular position of the rotating shaft using a signal related to the acceleration due to gravity detected by the shaft-mounted monitor 102. In other embodiments, the shaft-mounted monitor 102 may determine a torque in the rotating shaft, a temperature of the rotating shaft, an ambient temperature near the rotating shaft, a plurality of temperatures of the rotating shaft, and the like. Temperature information may be used in some embodiments to identify abnormal conditions (e.g., rotor and alignment conditions). Further, ambient temperature readings may also be used to bias current based thermal elements.

The wireless access point 110 may further be in communication with a monitoring system 130. The monitoring system 130 may be a local or remote computing device, an access controller, a programmable logic controller, a Supervisory Control and Data Acquisition ("SCADA") system, or the like. The monitoring system 130 may similarly be configured to receive the signals originating from the shaft-mounted monitor 102 and calculating rotational components of the rotating shaft 100 from the signals. For example, the monitoring system 130 may be configured to calculate a rotational speed, angular position, or the like, of the rotating shaft 100 using the signals.

Figure 2:
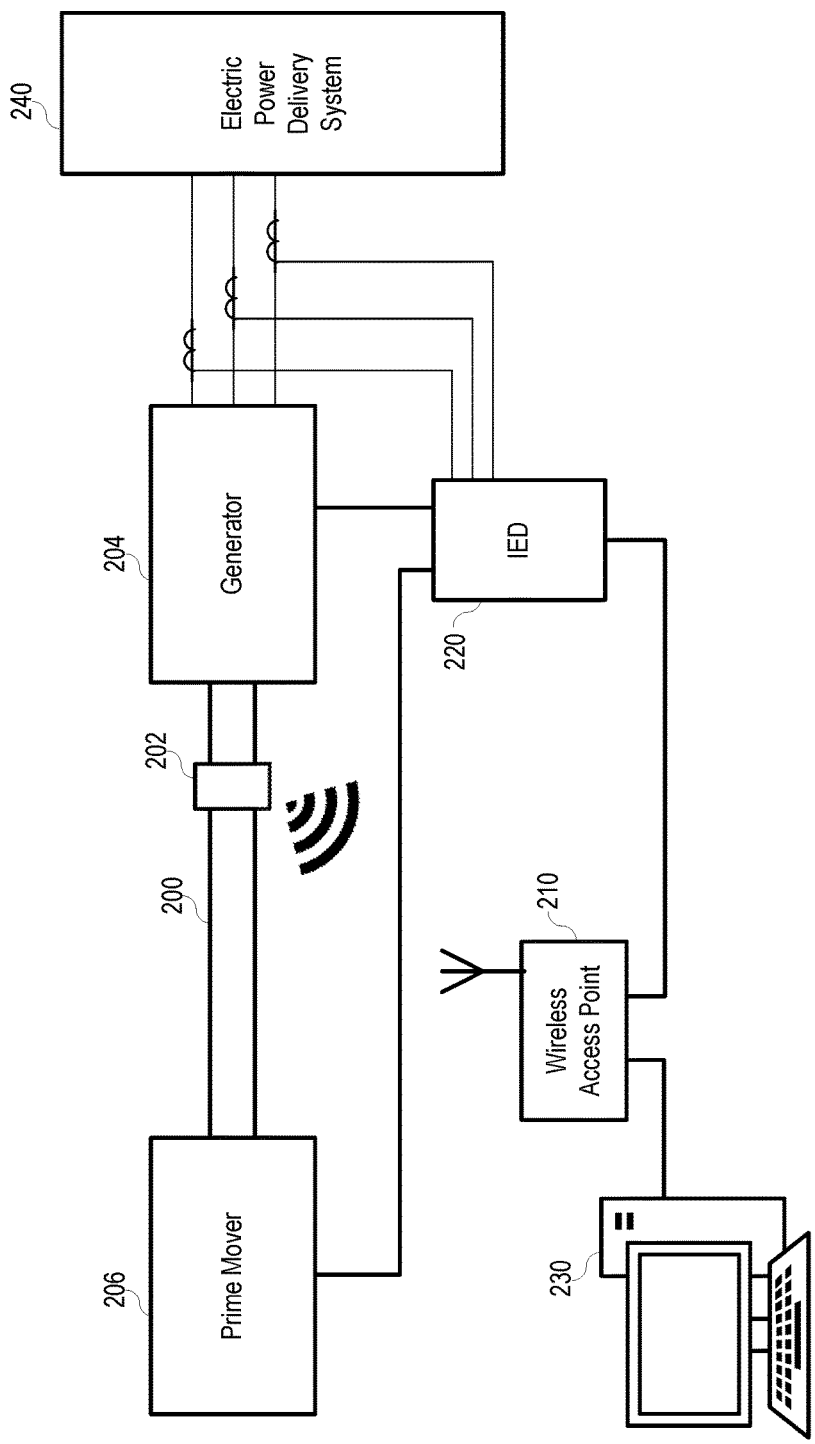
FIG. 2 illustrates a simplified block diagram of a power generation system including a shaft-mounted system configured to monitor a rotating shaft consistent with various embodiments of the present disclosure.

FIG. 2 illustrates a simplified block diagram of a power generation system including a shaft-mounted system configured to monitor a rotating shaft consistent with various embodiments of the present disclosure. According to the embodiment illustrated in FIG. 2, the rotating shaft 200 comprises a rotating shaft driving an electric power generator 204 by a prime mover 206. The electric power generator 204 is configured to generate electric power from the mechanical power provided thereto by the prime mover 206 via the rotating shaft 200 and to supply such electric power to the electric power delivery system 240. The IED 220 may be, for example, a generator protection IED configured to monitor and protect the generator 204. The IED 220 may be configured to obtain electric power system signals from the electric power produced by the generator 204. IED 220 may be in communication with the electric power outputs using CTs, PTs, or the like.

IED 220 may be configured to separate the generator 204 from the electric power delivery system 240 upon detection of certain operating conditions of the generator 204 by, for example, opening a circuit breaker connecting the generator 204 to the electric power delivery system 240. IED 220 may further be configured to control the prime mover 206 in response to conditions detected from the output of the generator 204. For example, the prime mover 206 may be a diesel engine, and the IED may be configured to maintain a certain output of the generator by controlling the fuel provided to the diesel engine.

IED 220 may also be in communication with generator 204 and may monitor a variety of operating conditions of rotating equipment which may be monitored by IEDs. For example, generator protection IEDs may monitor and control for over/under speed protection, power output, frequency, stator or rotor faults, brush liftoff, and the like. Such information may be provided by generator 204 to IED 220.

Although specifically described in conjunction with the monitoring of rotating shafts of generators and motors, embodiments described herein may be used to monitor the rotational speed and/or angle of any rotating shaft. In various embodiments, the rotating shaft may be a rotating shaft of a motor, a generator, a transmission shaft, a drive shaft, an axle, a crankshaft, or the like.

In several embodiments described herein, the shaft-mounted monitor 202 may be configured to wirelessly transmit signals according to an established protocol such as, for example, WiFi, Bluetooth, Zigbee, or the like. In such an embodiment, the IED 220 may include a wireless interface to wirelessly communicate with the shaft-mounted monitor 202. Furthermore, the IED 220 may include a standardized input that may receive a wireless interface for receiving the wireless communications from the shaft-mounted monitor 202. Alternatively, the IED 220 may include a non-standardized input for receiving a wireless interface or include no input at all for receiving a wireless interface. For example, the IED 220 may include a serial port or a USB port, and the wireless interface may include a Bluetooth-to-serial converter such as, for example, the SEL-2925 Bluetooth Serial Adapter available from Schweitzer Engineering Laboratories, Inc. of Pullman, Wash., USA. The wireless interface may receive the wireless transmissions from the shaft-mounted monitor 202 and provide such signals to the IED 220. Alternatively, the IED may include an integrated wireless interface for communication with the shaft-mounted monitor 202.

The shaft-mounted monitor 202 may be configured to monitor several conditions of the rotating machinery using data collected from sensors of the shaft-mounted monitor. As described in several embodiments herein, the shaft-mounted monitor 202 may include various sensors in communication with a processor. The shaft-mounted monitor 202 may include computer instructions on non-transitory computer-readable media, that may be executed on the processor to perform various monitoring calculations. The shaft-mounted monitor 202 may further be configured to communicate results of such monitoring through a wireless access point 210 to an IED 220, a monitoring system 230, or the like. The IED 220 and/or monitoring system 230 may be configured to take protective or monitoring actions using the results communicated thereto by the shaft-mounted monitor 202.

Figure 3:
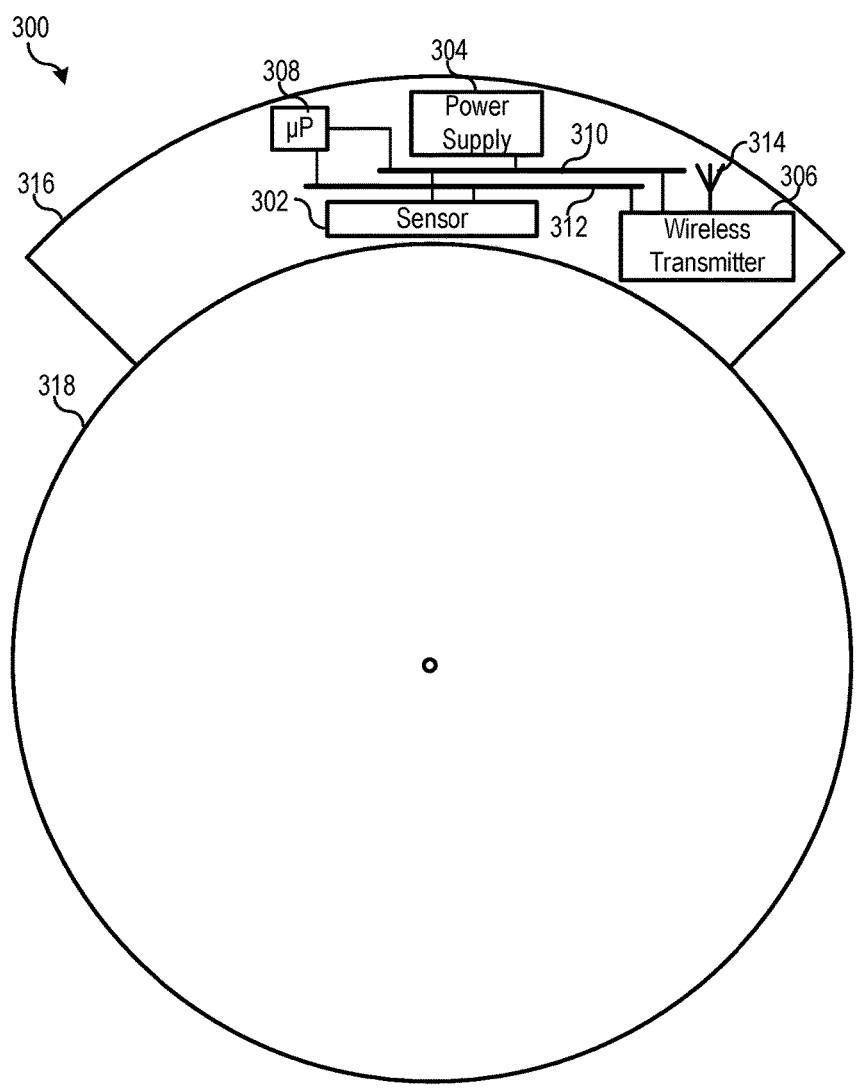
FIG. 3 illustrates a functional block diagram of a system for monitoring a rotating shaft consistent with various embodiments of the present disclosure.

FIG. 3 illustrates a functional block diagram of a system 300 for monitoring a rotating shaft 318 consistent with various embodiments of the present disclosure. System 300 may be used in the embodiments illustrated and described in conjunction with several embodiments herein, including those illustrated in FIGS. 1 and 2. The shaft-mounted system 300 may include a housing 316 affixed to the rotating shaft. The housing may include the various components of the shaft-mounted monitor. The shaft may be fixed to the rotating shaft 318 using mechanical fixing devices such as a clamp, an adhesive, or the like. Components of the shaft-mounted monitor 102 may be powered by a power supply 304 in electrical communication with a power bus 310. The power supply 304 may be powered by, for example, a battery, a piezoelectric generator, a micro-electromechanical system (MEMS) generator, or the like. In some embodiments, the power supply may be replenished by generating power from the movement of the shaft. In one specific embodiment, the power supply may be configured to receive power from an inductively coupled power source.

The shaft-mounted system 300 may include a sensor 302, a wireless transmitter 306, and a processor 308, each of which may be in communication with a data bus 312 and receive power from the power supply 304 using the power bus 310. The data bus may operate according to a standard such as, for example, the I2C standard. The processor 308 may be a microprocessor, field-programmable gate array (FPGA), controller, application specific integrated circuit (ASIC), or the like. The processor 308 may include a memory component for storing computer instructions to be executed by the processor 308. In certain embodiments, the shaft-mounted monitor 102 may also include a memory component in communication with the bus 312 for storing computer instructions for execution by the processor. In certain embodiments, the memory component may be used to store information, and may be re-writeable.

The sensor 302 may be a sensor for detecting various conditions of the rotating shaft 318 and/or conditions ambient to the rotating shaft. For example, the sensor 302 may be configured to detect shaft temperature, acceleration, torque, ambient temperature, or the like. Although a single sensor 302 is illustrated, the shaft-mounted system 300 may include a plurality of sensors. In one particular embodiment, the sensor 302 may be an accelerometer configured to detect an acceleration and to provide a signal corresponding to the detected acceleration for use by the processor 308 and/or transmitted by the wireless transmitter 306. The processor 308 may be configured to control the sensor 302 and the wireless transmitter 306. The wireless transmitter 306 may be configured to transmit a signal related to the output of the sensor 302, communications from the processor 308, and the like. The wireless transmitter 306 may include or be in communication with an antenna device 314 for wireless transmission of the signal. The wireless transmitter 306, as has been described above, may be configured to transmit a signal according to a predetermined protocol such as, for example, IEEE 802.11, Bluetooth, Zigbee, Wireless USB, or the like.

The sensor 302 may operate according to piezoelectric, piezoresistive, capacitive principles or the like, including combinations thereof. The sensor 302 may be a MEMS accelerometer. The sensor 302 may be configured to measure accelerations of up to around ±3000 g.

The shaft-mounted system 300 may be mounted to the shaft 318 using a variety of coupling devices or techniques. In one embodiment, the shaft-mounted system 300 may be affixed to the shaft 318 using an adhesive. In another embodiment, the shaft-mounted system 300 may be fixed to the shaft 318 using a mechanical clamping mechanism. In other embodiments, the shaft-mounted system 300 may be fixed to the shaft 318 using more than one coupling device or techniques. For example, an adhesive and a mechanical clamping mechanism may be utilized to secure the shaft-mounted system 300 to the shaft 318.

The shaft-mounted system 300 as illustrated and described herein may be used to provide a signal related to the acceleration measured by the sensor 302. Such a signal may be used by an IED or a monitoring system to calculate a rotational speed and/or angular position of the rotating shaft as described herein. In other embodiments, the processor 308 may use the signal from the accelerometer to calculate a rotational speed and/or angular position of the rotating shaft as described herein. In such embodiments, the processor may be pre-set or programmable with the radius of the rotating shaft. The processor may be configured to transmit the calculated rotational speed and/or angular position using the wireless transmitter.

In still other embodiments, the processor may be configured to compare the calculated rotational speed with a predetermined threshold. The processor may be pre-set or programmable with the predetermined threshold. In such embodiments, the processor may be configured to cause the wireless transmitter 306 to transmit a message when the predetermined threshold is crossed. In one particular embodiment, the shaft-mounted sensor may be configured to transmit a speed sensor message once the calculated rotational speed reaches a predetermined threshold. The IED or other monitoring system may be configured to interrupt operation of the rotating machinery coupled to the rotating shaft 318 if the speed switch message is not received within a predetermined time from starting the rotating machinery. In other embodiments, the threshold may be set above a nominal operating condition of the rotating machinery. The processor may be configured to cause the wireless transmitter to transmit a message indicating that the rotational speed of the shaft has exceeded the threshold. The IED or other monitoring system may use such message in protection and monitoring of the rotating machinery.

Figure 4:
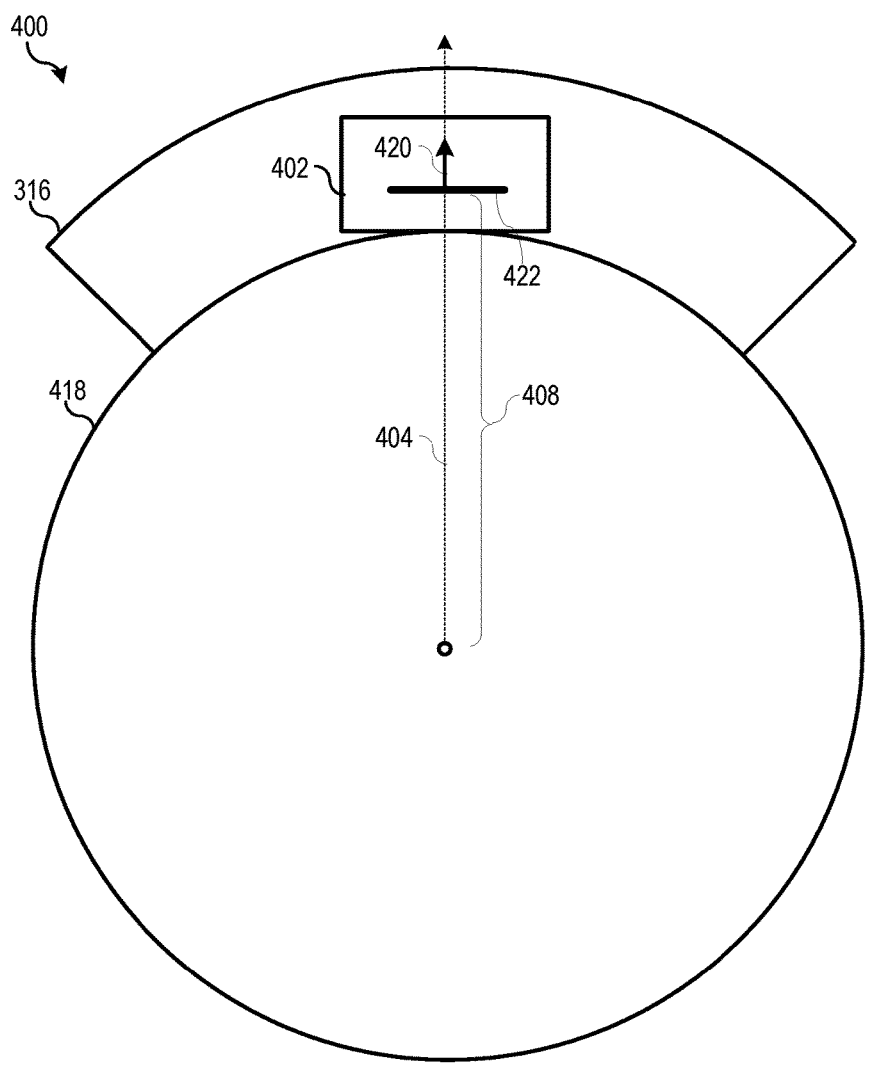
FIG. 4 illustrates a simplified representation of a shaft-mounted monitor system for monitoring a rotating shaft consistent with various embodiments of the present disclosure.

FIG. 4 illustrates a simplified representation of a shaft-mounted monitor system 400 for monitoring a rotating shaft 418 consistent with various embodiments of the present disclosure. A sensor 402 may include sensing component 422 fixed a known distance 408 from the center of the shaft 418. Furthermore, the accelerometer 402 includes an axis 420 of detection, and determines an acceleration along the axis 420 of detection. In one embodiment, the sensor 402 is fixed to the rotating shaft 418 such that the axis of detection 420 is collinear with a radius 404 of the rotating shaft.

According to the embodiment illustrated in FIG. 4, the acceleration measured by the sensor 402 is a radial acceleration, and the rotational speed of the rotating shaft 418 may be expressed as a function of the measured radial acceleration and the distance 408 from the center of the rotating shaft 418 to the sensing component 402. Equations 1-3 may be used to calculate the rotational speed.

$$RPM = \frac{60}{2\pi}\sqrt{\frac{a}{r}} \qquad \text{Eq. 1}$$

$$\text{rev/s} = \frac{1}{2\pi}\sqrt{\frac{a}{r}} \qquad \text{Eq. 2}$$

$$\text{rad/s} = \sqrt{\frac{a}{r}} \qquad \text{Eq. 3}$$

where:
RPM is rotations per minute;
a is the acceleration measured in meters-per-second-per-second (m/s$^2$);
r is the distance from the center of the rotating shaft to the sensing component in meters;
rev/s is revolutions per second; and
rad/s is radians per second.

The embodiment illustrated in conjunction with FIG. 4, and Equations 1-3 may be used where the acceleration measured by the accelerometer is due only to the rotation of the rotating shaft. For example, where the shaft is mounted vertically, the measured acceleration is likely only due to the rotation of the rotating shaft. However, where the shaft is not mounted vertically, the measured acceleration may include a component of the acceleration due to the rotation of the rotating shaft and a component due to the acceleration of gravity.

Figure 5:
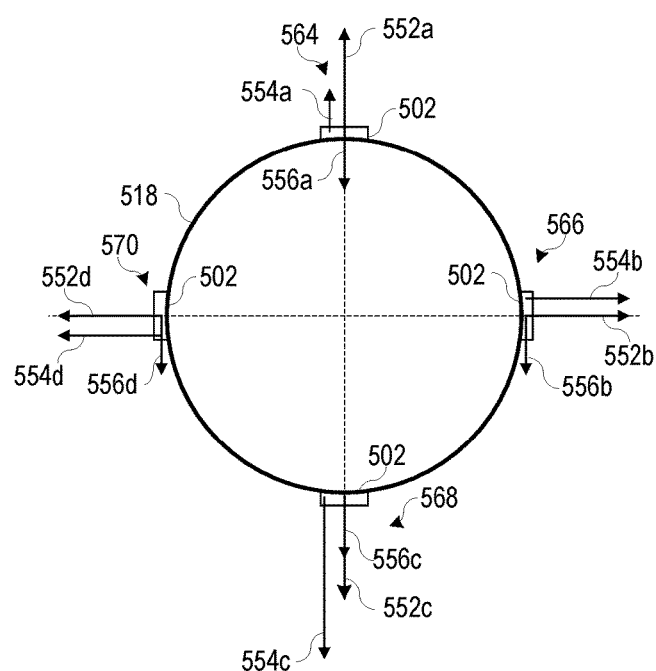
FIG. 5 illustrates a view of the sensor at a plurality of positions as rotating shaft as the shaft rotates and a plot of the measured acceleration over time during two periods of rotation consistent with various embodiments of the present disclosure.
Figure 5:
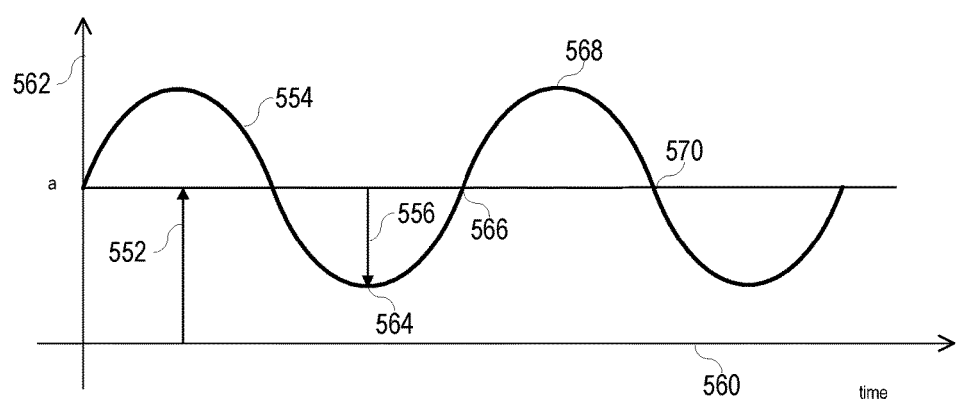

FIG. 5 illustrates a view of a sensor 502 at a plurality of positions as rotating shaft as the shaft 518 rotates and a plot of the measured acceleration over time during two periods of rotation consistent with various embodiments of the present disclosure. In a first position 564 with the sensor 502 on a top of the rotating shaft 518, the sensor 502 will output a measured acceleration 554a which is a sum of the radial component of acceleration due to gravity 556a and a radial acceleration 552a due to the rotation of the rotating shaft 518.

Subsequently, at position 566, the sensor 502 will output a measured acceleration 554b which is a sum of the radial component of the acceleration due to gravity 556b and a radial acceleration 552b due to the rotation of the rotating shaft 518. Similarly, at position 568, the accelerometer 502 will output a measured acceleration 554c which is a sum of the radial component of the acceleration due to gravity 556c and a radial acceleration 552c due to the rotation of the rotating shaft 518.

Finally, as illustrated at position 570, the accelerometer 502 will output a measured acceleration 554d which is a sum of the radial component of acceleration due to gravity 556d and a radial acceleration 552d due to the rotation of the rotating shaft 518. It should be noted that the acceleration due to gravity in the radial direction at positions 566 and 570 is zero. Thus, at positions 566 and 570, the measured acceleration is the acceleration due to the rotation of the rotating shaft. At positions 564 and 568, however, the measured acceleration is the sum of the acceleration due to gravity and the acceleration due to the rotation of the rotating shaft.

FIG. 5 further illustrates a plot of acceleration 562 over time 560 at the various positions 564, 566, 568, and 570. The measured acceleration 554 at position 564 is the sum of the acceleration due to gravity 556 and the acceleration 552 due to the rotation of the rotating shaft. At positions 566 and 570, the measured acceleration 554 is due only to the acceleration 552 of the rotating shaft. At position 568, the measured acceleration 554 is due to the sum of the acceleration due to gravity 556 and the acceleration 552 due to the rotation of the rotating shaft.

The measured acceleration as illustrated in FIG. 5 may be used to calculate the rotational speed of the rotating shaft. However, because each instantaneous measured acceleration value includes components due to the acceleration of the rotating shaft and acceleration due to gravity, the measured acceleration 554 cannot be used as the acceleration in Equations 1-3 to calculate the rotational speed. It should be noted that the measured acceleration 554 is a periodic waveform with an offset. The offset is the acceleration due to the rotation of the rotating shaft. In some embodiments, an average of the measured acceleration over a predetermined time may be used as the acceleration in Equations 1-3 to determine the rotational speed of the rotating shaft. In several embodiments herein, the average of the measured acceleration may be determined using a low-pass filter on the measured acceleration.

In some embodiments, the rotational speed of the rotating shaft may be calculated using a period of the periodic waveform from the measured acceleration 554. A time between positive peaks (or negative peaks) may be measured to determine a period of the periodic waveform. The inverse of the period is a frequency of the periodic waveform, and hence a frequency of the rotating shaft in revolutions per second. Such frequency can be used to determine the rotational speed in the desired units such as, for example, revolutions per second, revolutions per minute, radians per second, or the like.

Figure 6:
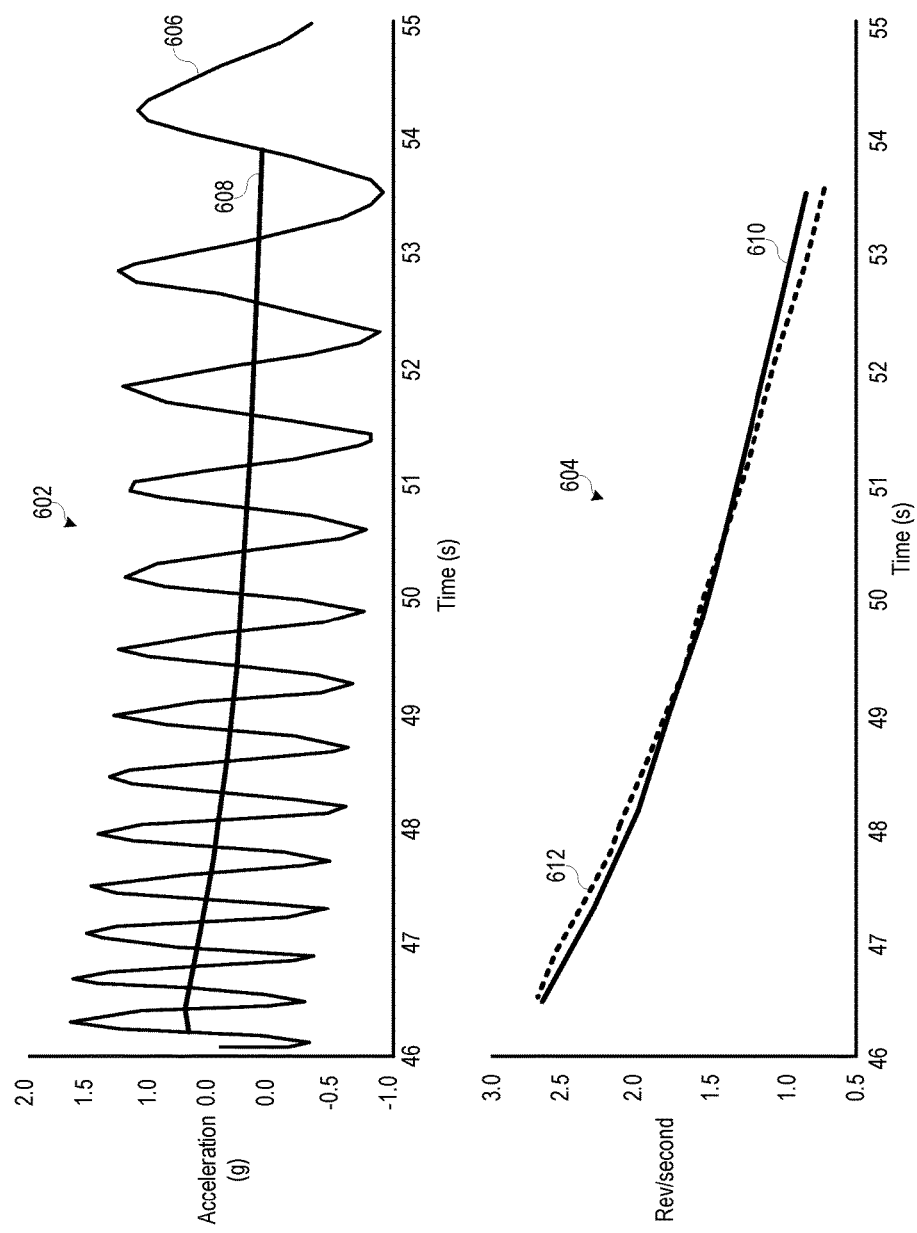
FIG. 6 illustrates plots over time of the measured acceleration and the calculated rotational speed of a rotating shaft consistent with various embodiments of the present disclosure.

FIG. 6 illustrates plots over time of the measured acceleration and the calculated rotational speed of a rotating shaft consistent with embodiments of the present disclosure. Plot 602 illustrates the measured acceleration 606 as the rotating shaft slows as well as a calculated average 608 of the measured acceleration as the rotating shaft slows. Plot 604 illustrates the calculated rotational speed of the rotating shaft in revolutions per second. Trace 612 illustrates the rotational speed calculated using a determined period from peak values of the measured acceleration, as described above. Trace 610 uses the average of the measured acceleration 606 as the acceleration in Equation 2.

In embodiments where the rotating shaft is configured with its axis in the horizontal, the amplitude of the waveform due to gravity will be 1 g. For example, the maximum amplitude of the measured acceleration 606 illustrated in FIG. 6 is close to 1 g, so the rotating shaft must be configured with its axis near horizontal. In embodiments where the rotating shaft is configured with its axis in orientations approaching vertical, the acceleration due to gravity in the radial direction with respect to the rotating shaft will approach zero.

In embodiments where the measured acceleration includes a component due to the acceleration of gravity such as where the rotating shaft is in a non-vertical orientation, an angular position of the rotating shaft may be calculated. That is, where the shaft is configured with its axis not in the vertical direction, the measured acceleration will be a periodic waveform with an offset related to the rotational speed of the rotating shaft, an amplitude related to the orientation of the shaft from horizontal to vertical, and a periodicity that can be used to calculate an angular position of the rotating shaft. For example, a difference between the measured acceleration and the average acceleration can be normalized by the amplitude of the waveform and used to calculate the angular position in radians or degrees. Such calculation may be expressed as Equation 4:

$$\alpha = \sin^{-1}\left(\frac{a_m - a_v}{A}\right) \quad \text{Eq. 4}$$

where:
α is an angular position of the rotating shaft;
$a_m$ is the measured acceleration;
$a_v$ is the average acceleration; and
A is the amplitude of the waveform (1 g for horizontally mounted rotating shafts).

Figure 7:
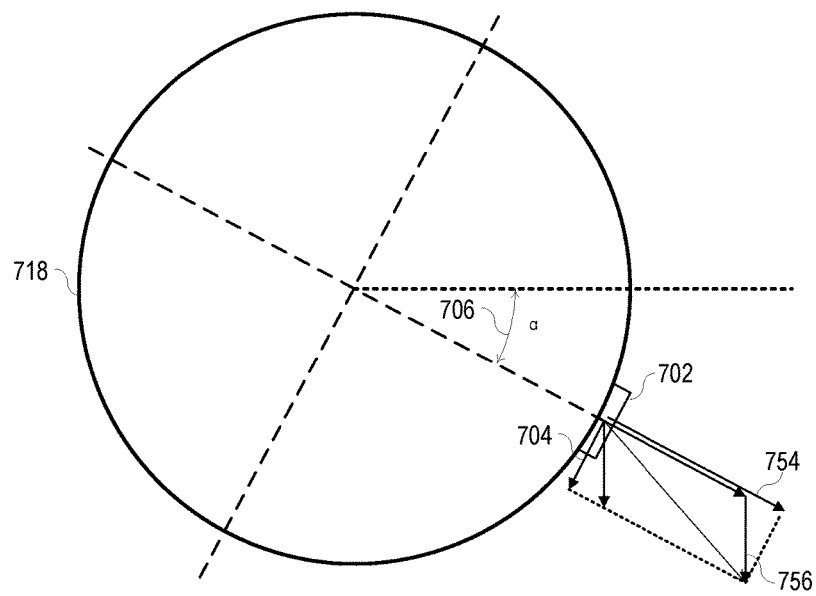
FIG. 7 illustrates a diagram of a plurality of forces detected by a sensor mounted to a rotating shaft and disposed at an angle $\alpha$ with respect to a horizontal plane consistent with various embodiments of the present disclosure.
Figure 7:
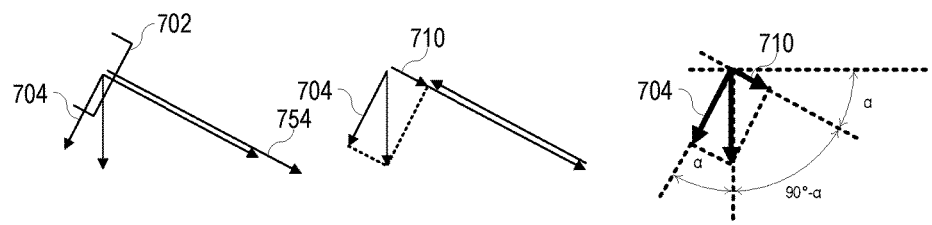

FIG. 7 illustrates a diagram of a plurality of forces detected by a sensor 702 mounted to a rotating shaft 718 and disposed at an angle α 706 with respect to a horizontal plane consistent with various embodiments of the present disclosure. The sensor 702 according to the illustrated embodiments may include two axes of sensing. In various embodiments, the sensor 702 may be embodied as a two-axis or three-axis accelerometer. The sensor 702 may be fixed to the rotating shaft 718 such that one axis of sensing is collinear with a radius of the rotating shaft 718, and another axis of sensing in a direction tangential to the rotating shaft 718. Sensor 702 may be configured to measure a tangential acceleration 704 and a radial acceleration 754. A rotational speed of the rotating shaft may be calculated using the measured radial acceleration 754 according to the several embodiments described above.

The angular position of the rotating shaft 718 may be calculated during operation and at standstill using the measured tangential acceleration 704 and measured radial acceleration 754. The angular position of the rotating shaft can be calculated using the measured tangential acceleration 704 and a difference 710 between the measured radial acceleration 754 and the radial acceleration due to the rotation of the shaft, which may be approximated using an average radial acceleration. As discussed above, a variety of methods may be used to calculate the average radial acceleration such as, for example, use of a low-pass filter. The angular position a of the rotating shaft may be calculated using Equation 5:

$$\alpha = \tan^{-1}\left(\frac{Mx}{Mt}\right) \quad \text{Eq. 5}$$

where:
a is an angular position of the rotating shaft;
Mx is Mr–a;
Mt is the measured tangential acceleration;
Mr is the measured radial acceleration; and
a is the acceleration due to shaft rotation, which may be an average of Mr.

Figure 8:
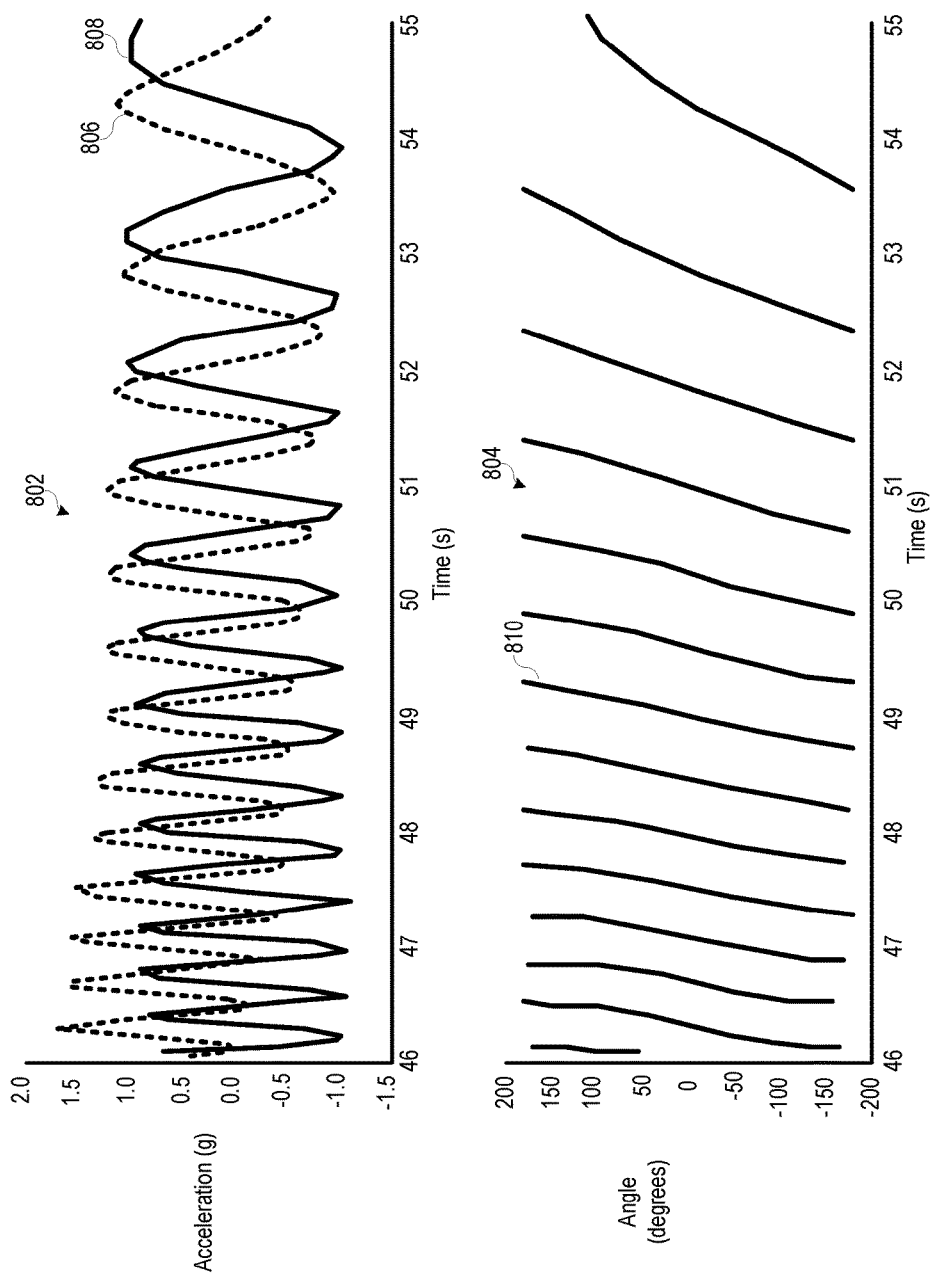
FIG. 8 illustrates plots of the acceleration measured by a dual-axis accelerometer and angular position of a rotating shaft consistent with various embodiments of the present disclosure.

FIG. 8 illustrates plots of the measured radial and tangential acceleration of a rotating shaft and the calculated angular position in degrees of the rotating shaft. Plot 802 shows trace 806 representing the measured radial acceleration and shows trace 808 representing the measured tangential acceleration. FIG. 8 represents the acceleration and angle of a rotating shaft as the rotating shaft slows. Using the embodiments described herein, and in particular Equation 5, the angular position of the rotating shaft is calculated and shown in plot 804 as trace 810 in degrees.

In certain embodiments, the angular position of the rotating shaft may be used to calculate the rotational speed of the rotating shaft. The angular position of the rotating shaft may be calculated according to any of the embodiments described herein. To calculate the rotational speed of the rotating shaft, the change in angular position with respect to time may be calculated using, for example, Equation 6.

$$S = \frac{d\alpha}{dt} \quad \text{Eq. 6}$$

where:
α is an angular position of the rotating shaft; and
S is the rotational speed of the rotating shaft.

In one embodiment, the processor of the shaft-mounted sensor is configured to calculate the rotational speed of the shaft using the angular position of the rotating shaft. In other embodiments, an IED may be configured to calculate the rotational speed of the shaft using the angular position of the rotating shaft.

Rotating shafts of rotating machinery in industry and utility are configured in a wide array of diameters and nominal rotational speeds. The radial acceleration to be measured by a shaft mounted accelerometer according to the various embodiments herein is a function of the rotational speed of the rotating shaft and the distance from the center of the rotating shaft to the acceleration sensing component of the shaft-mounted accelerometer. Thus, accelerometers according to the various embodiments herein may be used to measure a wide range of acceleration. Table 1 shows several different radial acceleration values that may be measured by accelerometers on shafts of different radii and at different rotational speeds:

TABLE 1

| Rotational Speed | | | Shaft radius [mm] | | | | | | |
|---|---|---|---|---|---|---|---|---|---|
| | | | 5 mm (~⅓HP) | | 25 mm | | 40 mm | | 105 mm (~100 HP) | |
| RPM | rev/sec | rads/sec | m/s² | g | m/s² | g | m/s² | g | m/s² | g |
| 60 | 1 | 6.28 | 0.20 | 0.0 | 1 | 0.1 | 2 | 0.2 | 4 | 0.4 |
| 750 | 12.5 | 78.54 | 31 | 3.1 | 154 | 15.7 | 247 | 25.2 | 648 | 66.1 |
| 900 | 15 | 94.25 | 44 | 4.5 | 222 | 22.7 | 355 | 36.3 | 933 | 95.2 |
| 1500 | 25 | 157.08 | 123 | 12.6 | 617 | 62.9 | 987 | 100.7 | 2591 | 264.4 |
| 1800 | 30 | 188.50 | 178 | 18.1 | 888 | 90.6 | 1421 | 145.0 | 3731 | 380.7 |
| 3000 | 50 | 314.16 | 493 | 50.4 | 2467 | 251.8 | 3948 | 402.8 | 10363 | 1057.5 |
| 3600 | 60 | 376.99 | 711 | 72.5 | 3553 | 362.6 | 5685 | 580.1 | 14923 | 1522.7 |

The useful range of accelerometers used to measure radial acceleration on a rotating shaft may be extended according to several embodiments herein. An accelerometer of a shaft-mounted sensor according to embodiments such as is illustrated in FIG. 4 with an axis collinear with a radius of the rotating shaft will output a signal that can be used to calculate the detected radial acceleration. Accelerometers with a predetermined rating would be useful on shafts with a radius and rotational speed that would yield an acceleration within the predetermined rating. For example, an accelerometer rated at ±100 g would be useful for certain shafts at certain rotational speeds, but would not be useful for measuring a radial acceleration on larger shafts, or at higher speeds (e.g. a shaft with a 40 mm radius above 1500 RPM). However, according to certain embodiments herein, the useful range of an accelerometer may be extended by orienting the accelerometer such that its axis of measurement is at a predetermined angle from the radius of the rotating shaft.

As illustrated in FIG. 4, the sensor 402 includes an axis 420 of sensing acceleration. In another embodiment, the sensor 402 may include an axis of sensing acceleration that is oriented at a predetermined angle θ from the radius 404 of the rotating shaft 100. The measured acceleration of an accelerometer is then less than the actual radial acceleration by a factor that is a function of the predetermined angle. That is, the useful range of the accelerometer is extended by a factor that is a function of the predetermined angle. For example, an accelerometer oriented with its axis at a predetermined angle of 60° would output an acceleration of half of the radial acceleration. Such would result in an extension factor of 2, in that the accelerometer would be useful to measure accelerations up to twice its rated range. However, the output would be the inverse of the range extension factor. Table 2 illustrates a number of predetermined angles and range extension factors for accelerometers oriented with the predetermined angles.

TABLE 2

| Angle | Range extension factor |
|---|---|
| 0.0 | 1 |
| 45.0 | 1.41 |
| 48.2 | 1.5 |
| 60.0 | 2 |
| 70.5 | 3 |
| 78.4 | 5 |
| 84.3 | 10 |

In certain embodiments, the accelerometer may be oriented within the shaft-mounted sensor such that an axis of the accelerometer is oriented at a known angle from collinear with the radius of the rotating shaft. The shaft-mounted sensor may be configured to use the known angle in its calculation of the acceleration by multiplying the acceleration from the accelerometer by the range extension factor to yield the measured acceleration.

Figure 9A:
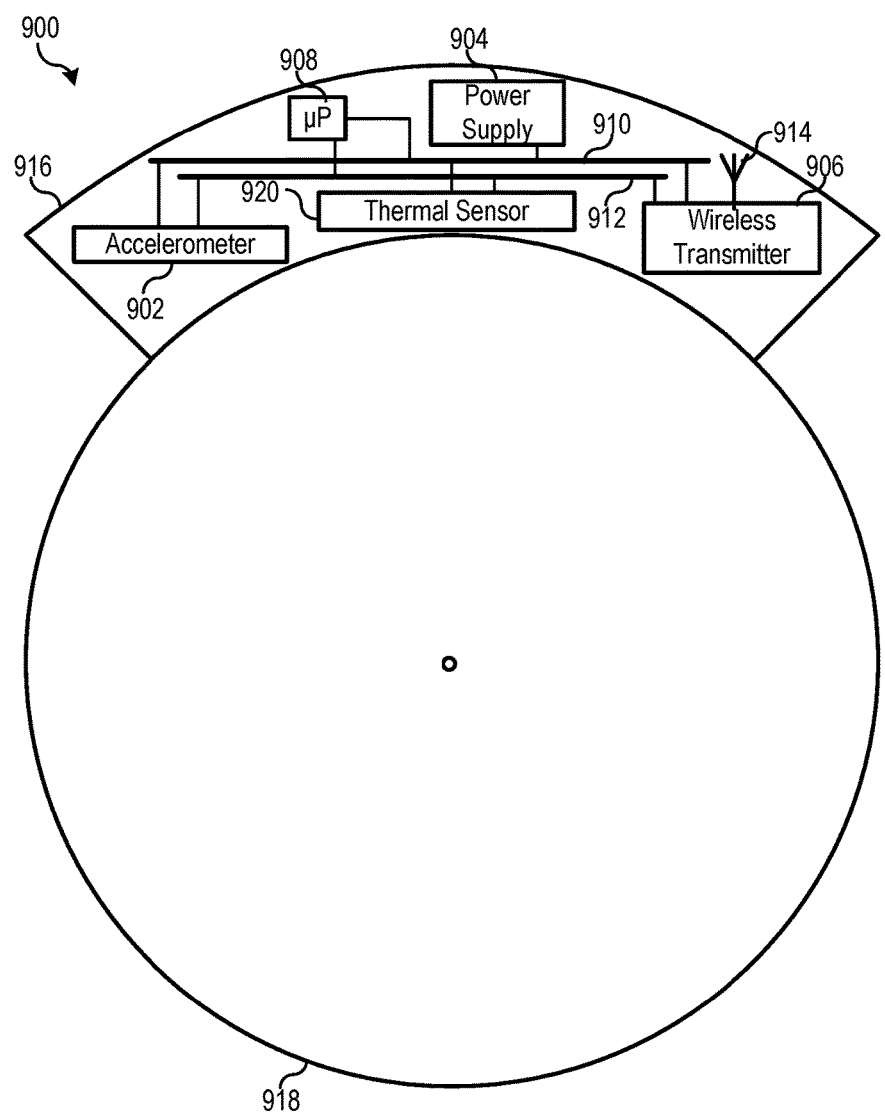
FIG. 9A illustrates a functional block diagram of a system for monitoring thermal parameters of a rotating shaft using a thermal sensor consistent with various embodiments of the present disclosure.

FIG. 9A illustrates a functional block diagram of a system 900 for monitoring thermal parameters of a rotating shaft 918 using a thermal sensor 920 consistent with various embodiments of the present disclosure. System 900 includes the thermal sensor 920, an accelerometer 902, and a wireless transmitter 906 and antenna 914, each of which is in communication with a microprocessor 908 through a data bus 912. A power supply 904 may provide power to various components of system 900, including the microprocessor 908, the thermal sensor 920, the accelerometer 902, and the wireless transmitter 906 through a power bus 910.

The thermal sensor 920 may be positioned within a housing 918 such that it is able to measure the temperature of the shaft 918. In some embodiments, the thermal sensor 920 may be sufficiently proximate to the rotating shaft 918 to directly obtain thermal measurements of the rotating shaft 918. In one embodiment, the thermal sensor 920 may include a sensing portion that extends through the shaft-mounted monitor 102 to directly contact the rotating shaft 918. In another embodiment, the housing 916 may contact the rotating shaft and may be formed of a thermally-conductive material. In such embodiment, the thermal sensor 920 may be in contact with the surface composed of the thermally-conductive material. The thermally-conductive material may include a metal such as aluminum, steel, or the like. In some embodiments, the thermal sensor may be a sensor that does not require contact with the rotating shaft 918, such as an infra-red (IR) thermal sensor. In such an embodiment, the housing 916 may include a window through which the IR thermal sensor may obtain thermal readings from the rotating shaft, ambient thermal readings, or the like.

Figure 9B:
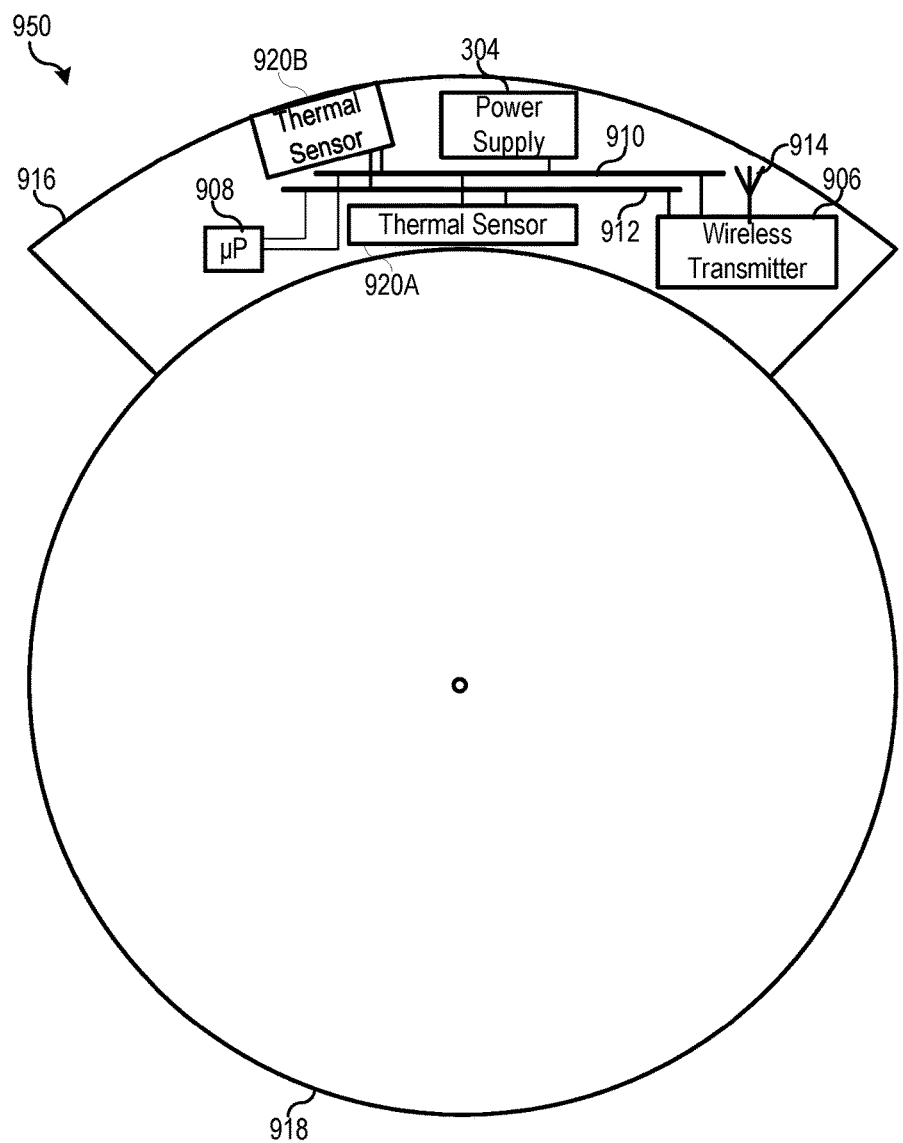
FIG. 9B illustrates a functional block diagram of a system for monitoring thermal parameters of a rotating shaft and an ambient environment using a plurality of thermal sensors consistent with various embodiments of the present disclosure.

FIG. 9B illustrates a functional block diagram of a system 950 for monitoring thermal parameters of a rotating shaft 918 and an ambient environment using a plurality of thermal sensors 920A, 920B consistent with various embodiments of the present disclosure. The thermal sensors 920A, 920B may be positioned within the housing 916 such that thermal sensor 920A obtains thermal measurements of the rotating shaft 918, and thermal sensor 920B obtains thermal measurements ambient to the rotating shaft 918. The different between the ambient temperature and the temperature of the shaft 918 may be used to determine heating of the shaft from the operation of a mechanical system used to drive the shaft 918.

Figure 9C:
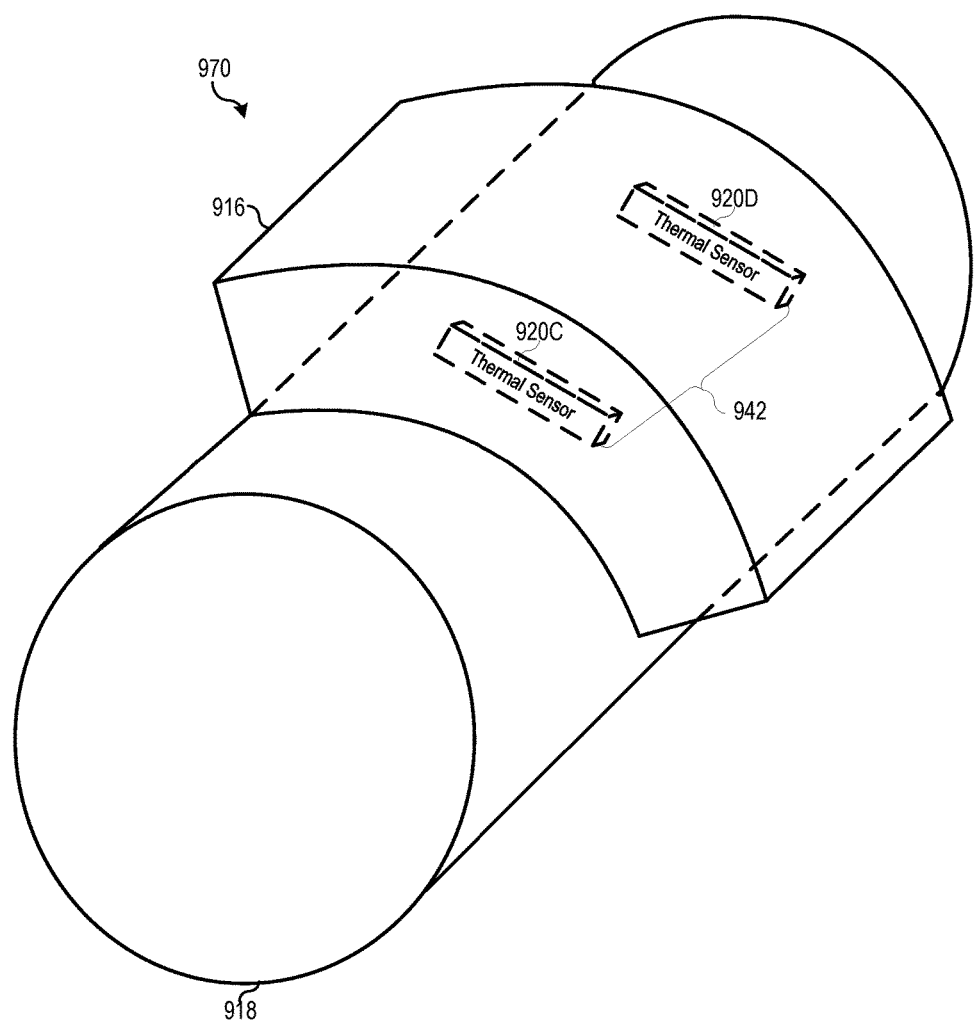
FIG. 9C illustrates a perspective view of a system for monitoring thermal parameters rotating shaft using a plurality of thermal sensors disposed along a length of the rotating shaft consistent with various embodiments of the present disclosure.

FIG. 9C illustrates a perspective view of a system 970 for monitoring thermal parameters rotating shaft using a plurality of thermal sensors 920C, 920D disposed along a length of the rotating shaft 918 consistent with various embodiments of the present disclosure. Although the various components illustrated in FIGS. 9A-9B are not illustrated in FIG. 9C, system 970 may include power and information buses, a power source, a microprocessor, a wireless transmitter, and the like. The illustrated thermal sensors 920C and 920D may be positioned within a housing 916 mounted on the rotating shaft 918 and separated along a length of the rotating shaft 918 by an axial separation 942. A plurality of thermal sensors disposed along the length of the shaft may be used to determine how the temperature of the shaft varies along its length.

Figure 10:
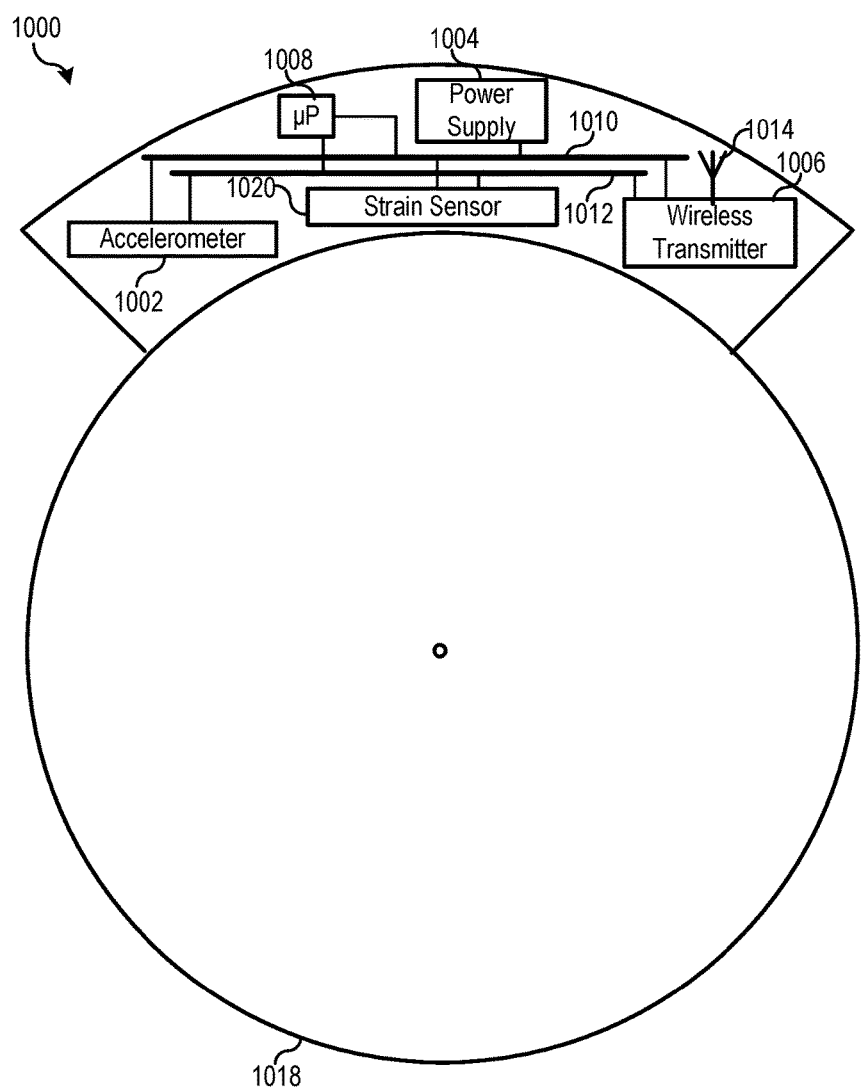
FIG. 10 illustrates a functional block diagram of a system for monitoring the strain on a rotating shaft using a strain sensor consistent with various embodiments of the present disclosure.

FIG. 10 illustrates a functional block diagram of a system 1000 for monitoring the strain on a rotating shaft 1018 using a strain sensor 1020 consistent with various embodiments of the present disclosure. System 1000 includes the strain sensor 1020, an accelerometer 1002, and a wireless transmitter 1006 and antenna 1014, each of which is in communication with a microprocessor 1008 through a data bus 1012. A power supply 1004 may provide power to various components of system 1000, including the microprocessor 1008, the strain sensor 1020, the accelerometer 1002, and the wireless transmitter 1006 through a power bus 1010.

The strain sensor 1002 may be in physical communication with the rotating shaft 100 to detect a strain of the rotating shaft 100. In one embodiment, the strain on the rotating shaft 1018 detected by the strain sensor 1002 may correspond with a torque of the rotating shaft 1018. The torque may correspond to a mechanical force transmitted by the rotating shaft 1018 from a source of mechanical energy (e.g., an electric motor, a prime mover) to a device configured to use make use of the mechanical energy.

Figure 11:
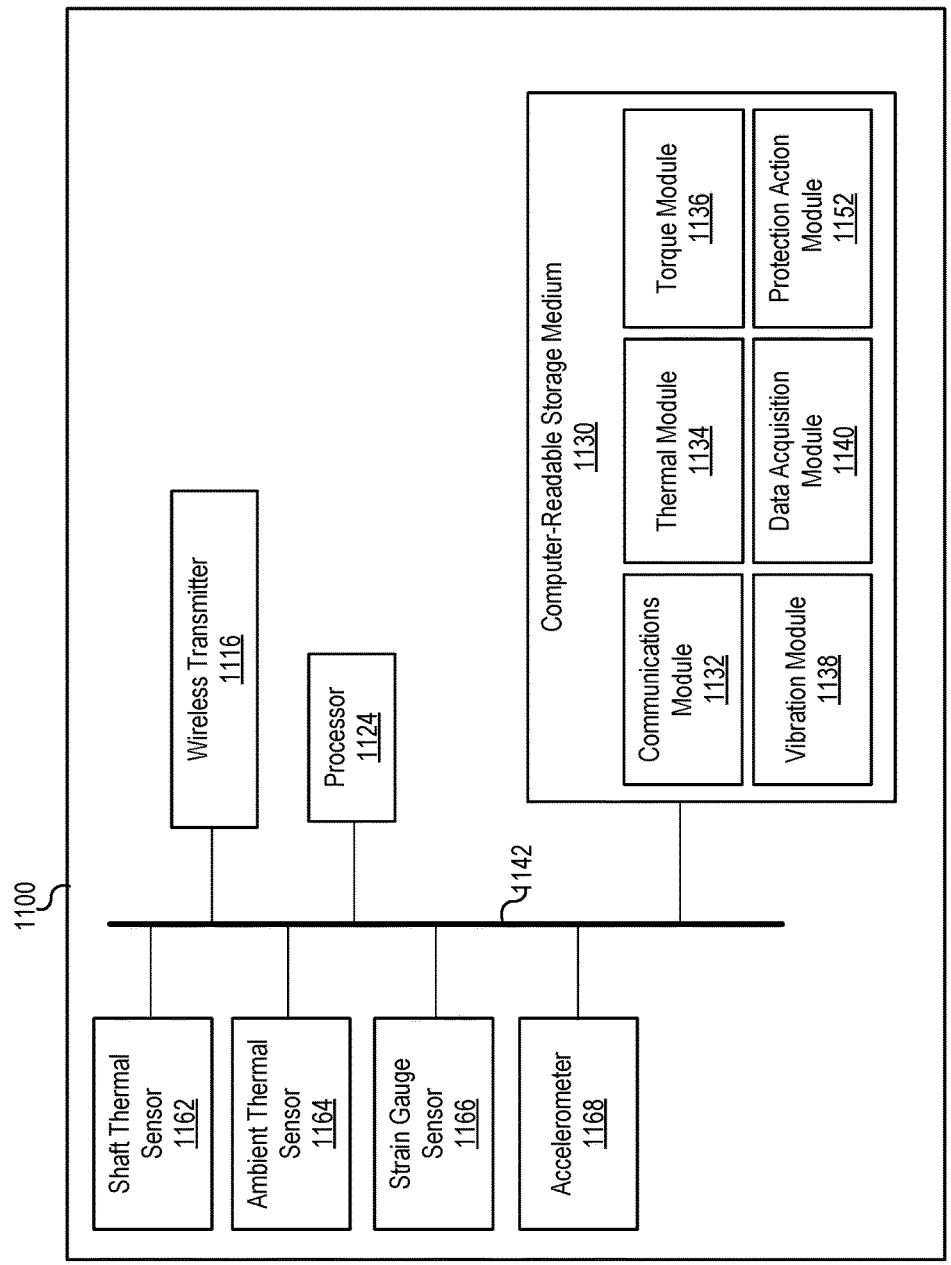
FIG. 11 illustrates a representative block diagram of a shaft-mounted monitor for monitoring various aspects of a rotating shaft of rotating machinery consistent with various embodiments of the present disclosure.

FIG. 11 illustrates a functional block diagram of a shaft-mounted monitor 1100 for monitoring a rotating shaft and/or rotating machinery consistent with embodiments of the present disclosure. System 1100 may be implemented using hardware, software, firmware, and/or any combination thereof. In some embodiments, system 1100 may be embodied as an IED, while in other embodiments, certain components or functions described herein may be associated with other devices or performed by other devices. The specifically illustrated configuration is merely representative of one embodiment consistent with the present disclosure.

System 1100 includes a wireless transmitter 1116 configured to communicate with monitoring systems, IEDs, and the like. In certain embodiments, the wireless transmitter 1116 may facilitate direct communication with other IEDs or communicate with systems over a communications network. Wireless transmitter 1116 may facilitate communications through a network. In various embodiment, wireless transmitter 1116 may utilize commercially available wireless communication technologies, including IEEE 802.11, Bluetooth, Zigbee, Wireless USB, etc.

Processor 1124 may be configured to process signals received from the various sensors, such as the shaft thermal sensor 1162, the shaft thermal sensor 1162, the ambient thermal sensor 1164, the strain sensor 1166, and the accelerometer 1168. In other embodiments, more or fewer sensors may be included in system 1100. Processor 1124 may operate using any number of processing rates and architectures. Processor 1124 may be configured to perform various algorithms and calculations described herein. Processor 1124 may be embodied as a general purpose integrated circuit, an ASIC, a field-programmable gate array, and/or any other suitable programmable logic device.

A computer-readable storage medium 1130 may be the repository of various software modules configured to perform any of the methods described herein. A data bus 1142 may link various sensor components 1162, 1164, 1166, 1168, wireless transmitter 1116, and computer-readable storage medium 1160 to processor 1124. Computer-readable storage medium 1130 may be part of the processor 1124 or separate from the processor 1124.

Communications module 1132 may be configured to allow system 1100 to communicate with any of a variety of external devices via wireless transmitter 1116. Communications module 1132 may be configured for communication using a variety of data communication protocols (e.g., TCP/IP, UDP over Ethernet, IEC 61850, etc.).

Data acquisition module 1140 may collect data samples originating from the various sensors such as acceleration, strain, temperatures, and the like. Data acquisition module 1140 may operate in conjunction with several monitoring modules such as, for example, a thermal module 1134, a torque module 1136, a vibration module 1138, and a protection action module 1152. According to one embodiment, data acquisition module 1140 may selectively store and retrieve data and may make the data available for further processing.

The vibration module 1138 may be configured to use signals from the accelerometer 1168 to determine various operating conditions of the rotating shaft and/or rotating machinery using the signals from the accelerometer 1168. In some embodiments, the vibration module may calculate a rotating speed of the rotating shaft and/or an angular position of the angular shaft as described hereinabove. In certain embodiments, the vibration module may be configured to determine a vibration of the rotating shaft using the signals from the accelerometer. For example, variations in the amplitude of the acceleration waveform signal may represent vibrations of the rotating shaft. The vibrations may be representative of various conditions of the rotating machinery such as, for example, bearing problems, broken bar, shaft misalignments, load oscillations, gear problems, and the like.

The thermal module 1134 may be configured to use the signals from the shaft thermal sensor (or sensors) 1162, and/or the ambient thermal sensor 1164. The thermal module 1134 may be configured to determine a thermal state of the shaft (such as a shaft temperature) using the shaft thermal sensor 1162. The thermal module 1134 may be configured to compare the shaft thermal sensor 1162 against a predetermined threshold and alarm when the shaft thermal condition exceeds the predetermined threshold.

In another embodiment, such as the embodiment disclosed in FIG. 9C where two shaft thermal sensors are used, the thermal module 1134 may be configured to determine a difference between the thermal condition at the rotating shaft and a first location and the thermal condition on the rotating shaft at a second location disposed along a length of the rotating shaft. A difference between the thermal conditions at the different locations along with the known distance between the locations may indicate a thermal state of the rotating machinery. That is, the rotating shaft may serve as a thermal sink for the rotating machinery, capable of transmitting an amount of thermal energy away from the rotating machine. If the difference between the temperatures from the shaft thermal sensors 1162 is too small, then the thermal module 1134 may alarm because insufficient thermal energy is being transmitted from the rotating machine via the rotating shaft. In some embodiments, the thermal module 1134 may alarm when the thermal condition from one or both of the shaft thermal sensors 1162 exceed a threshold and the difference between the thermal conditions at the shaft thermal sensors 1162 is below another predetermined threshold.

The two axial temperatures may be used by the shaft-mounted monitor to extrapolate a temperature within the rotating machine. In one embodiment, it may be assumed that the temperature decreases along the rotating shaft from the source of the mechanical energy linearly such that a temperature at the rotating machine may be extrapolated using the two temperature measurements, the axial displacement of the thermal sensors, and a distance along the rotating shaft between the thermal sensors and the rotating machine. Similar extrapolations may be made where the temperature decreases along the rotating shaft in a non-linear manner.

In another embodiment, the shaft-mounted monitor 1100 may include both a shaft thermal sensor 1162 and an ambient thermal sensor 1164, such as the embodiment illustrated in FIG. 9B. The thermal module may be configured to determine a difference between the thermal conditions on the rotating shaft and the ambient thermal conditions. As the rotating shaft may function to transmit thermal energy from the rotating machine, a difference between the ambient thermal conditions and the thermal conditions at the rotating shaft may be useful for determining if sufficient thermal energy is being transmitted from the rotating machine via the rotating shaft. In one embodiment, the thermal module 1134 may be configured to determine a difference between the ambient thermal conditions and the thermal conditions at the rotating shaft. If the difference is below a predetermined threshold, then the thermal module 1134 may be configured to send an alert. In some embodiments, the thermal module 1134 may alert only if the difference is below a predetermined threshold and the thermal condition at the rotating shaft exceeds another predetermined threshold.

In various embodiments, the rotating machine may be protected by an IED. The IED may be configured to determine thermal conditions of the rotating machine such as a rotor temperature, a stator temperature, and the like. Typically, the IED will not measure thermal conditions of the rotating machine directly, but will instead determine a thermal condition using a thermal model. For example, the thermal conditions may be determined using a thermal model from the monitored electrical inputs to or from the rotating machine such as current and/or voltage.

The torque module 1136 may be configured to use signals from the strain gauge sensor 1166. In one embodiment, the torque module 1136 may be configured to determine a torque of the rotating shaft using signals from the strain gauge sensor 1166. In one embodiment, the rotating shaft may connect an electric motor and a load. In another embodiment, the rotating shaft may connect a prime mover to a generator, where the torque is caused by the prime mover and the generator.

The torque module 1136 may be configured to monitor a torque in the rotating shaft. In one embodiment, the torque module 1136 may be configured to compare the torque against a predetermined threshold, and alarm when the torque exceeds a predetermined threshold. Furthermore, the shaft-mounted monitor 102 may be configured to communicate the torque to an IED, which may then use the torque in its thermal module of the rotating machine.

In another embodiment, the torque module 1136 may be configured to use the calculated torque and a rotational speed of the rotating shaft (e.g. from the vibration module 1138) to determine a power delivered by the rotating shaft. The power delivered by the rotating shaft may be calculated as the product of the torque and a rotational speed of the rotating shaft. The communications module 1132 may be configured to receive the torque and/or calculated power from the torque module 1134 and transmit such to an IED or monitoring device using the wireless transmitter 1116.

In one particular embodiment, the calculated power out from the torque module may be transmitted to an IED such as IED 120 of FIGS. 1 and 2. IED 102 may be configured to calculate power as the product of the obtained current and voltage. IED 102 may further calculate an efficiency of the rotating machine by calculating a ratio of the power detected by the shaft-mounted monitor to the power calculated by the IED 102. Information relating to the efficiency may be used by operators to optimize the system and evaluate the performance of components of the system. For example, an operator may utilize use information to determine the potential savings of replacing the motor 104 with a higher-efficiency motor.

In one embodiment the rotating machine is a motor, and IED 102 calculates a power in as a product of the current and voltage to the motor. IED 102 receives the power out from the shaft-mounted monitor, and calculates efficiency as a ratio of the power out over the power in. IED 102 may be configured to monitor the efficiency over time, establish a baseline, and send an alert if the efficiency falls below a threshold. The threshold may be a portion of the established baseline.

In another embodiment, the rotating machine may be a generator. The IED 102 may be configured to calculate a power out of the generator as a product of the current and voltage out of the generator. The IED 102 may receive the power provided to the generator as the power calculated by the shaft-mounted monitor. The IED 102 may further be configured to calculate an efficiency of the generator as a ratio of the power in from the shaft-mounted monitor over the power out calculated by the generator. The IED 102 may monitor the efficiency of the generator, establish a baseline, and alarm if the efficiency deviates from the baseline by a predetermined amount.

Decreasing efficiency of motors and generators may signify problems with the rotating machinery. Using such information, the owner of the rotating machinery may better understand when repairs or replacements of such rotating machinery are warranted before the rotating machine fails. Furthermore, knowledge of the decreasing efficiency of a motor may be useful for determining when to replace a less efficient motor with a more efficient motor.

A protective action module 1152 may be configured to determine a protective action that may then be transmitted to a consuming device such as an IED, monitoring system, or the like. In various embodiments, a protective action may include tripping a breaker, selectively isolating a portion of the electric power system, etc. In various embodiments, the protective action module 1152 may coordinate protective actions with other devices in communication with system 1100.

Figure 12:
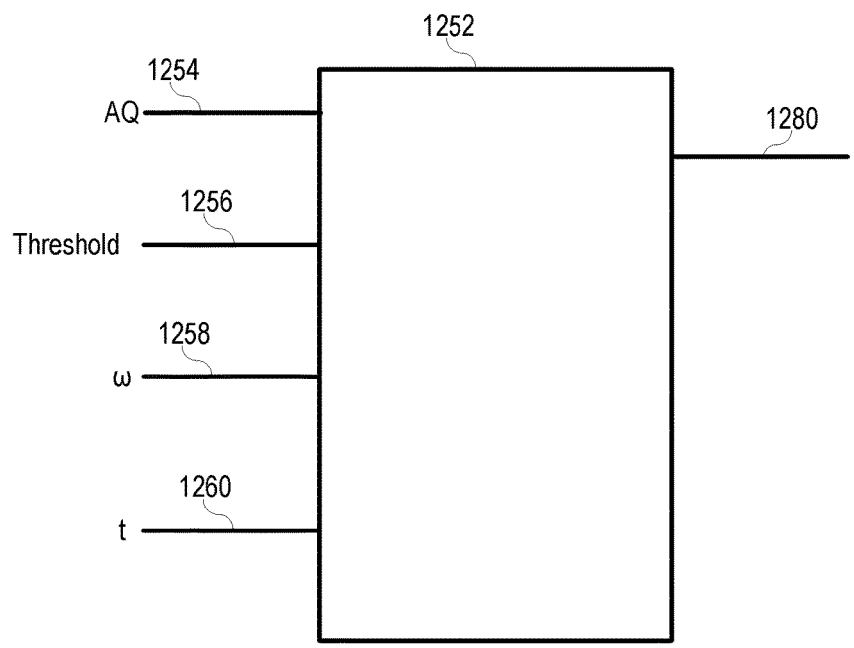
FIG. 12 illustrates a functional block diagram of a filter that may be used in a shaft-mounted monitor consistent with various embodiments of the present disclosure.

The shaft-mounted monitor of several embodiments herein may be used to detect unknown anomalies. For such detection, the shaft-mounted monitor may be configured to monitor changes in a detected profile from the shaft-mounted monitor. In one embodiment, the profile may be an acceleration profile from an accelerometer of the shaft-mounted monitor. In other embodiments, the profile may be a vibration profile from an accelerometer of the shaft-mounted monitor. The shaft-mounted monitor may be configured to monitor the output of the accelerometer using a filter, such as the filter illustrated in FIG. 12. The filter 1252 may include an input 1254 for receiving an analog quantity from one or more sensors of the shaft-mounted monitor. In the illustrated embodiment, the analog quantity may be an acceleration from an accelerometer of the shaft-mounted monitor. In the illustrated embodiment, the input $\omega$ 1258 may be a target frequency to be monitored. The target frequency $\omega$ 1258 may be related to a known frequency such as a rotating speed of the shaft, or the like. Alternatively, the target frequency to be monitored may be a frequency unrelated to the rotating speed of the shaft. In some embodiments, the target frequency to be monitored may be dynamic. For example, the input $\omega$ 1258 may be calculated and updated using a measurement or calculation (such as rotating speed) made by the shaft-mounted monitor.

The filter may receive a threshold 1256 and a time window 1260. The filter 1252 may be configured to calculate a frequency domain spectrum from the input analog quantity signal 1254 using, for example, a Fourier transform. The filter 1252 may be configured to filter the analog quantity using the time window and the target frequency to be monitored using, for example, a band-pass filter. The filter may then compare the filtered analog quantity against a threshold to determine if the frequency domain signal at the target frequency exceeds the threshold. The filter may alarm when the magnitude of the target frequency exceeds the threshold.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may not include long-distance transmission of high-voltage power. Moreover, principles described herein may also be utilized for protecting an electric system from over-frequency conditions, wherein power generation would be shed rather than load to reduce effects on the system. Accordingly, many changes may be made to the details of the above-described embodiments without departing from the underlying principles of this disclosure. The scope of the present invention should, therefore, be determined only by the following claims.

What is claimed is:

1. A shaft-mounted monitoring system configured to monitor a rotating shaft configured to transfer power from a prime mover to an electrical generator in an electric power generation system, the shaft-mounted monitoring system comprising:
   a housing configured to be coupled to the rotating shaft;
   a first sensor configured to be disposed within the housing, the first sensor further configured to output a first signal representative of a rotational component of the rotating shaft;
   a second sensor configured to be disposed within the housing, the second sensor further configured to output a second signal representative of a second condition related to the rotating shaft, the second signal representing a physical condition different from a rotational component of the rotating shaft;
   a processor in communication with the first sensor and the second sensor, and configured to:
      calculate a first condition related to the rotational component based on the first signal; and
      calculate a second condition based on the second signal, the second condition different from the rotational component of the rotating shaft;
   a wireless transmitter in communication with the processor and configured to transmit a digitized representation of the first condition and the second condition to a consuming device; and
   a power supply in electrical communication with the sensor, the wireless transmitter, and the processor, and configured to supply electrical power to the sensor, processor, and the wireless transmitter.

2. The shaft-mounted monitoring system of claim 1, wherein the consuming device comprises a protective relay configured to:
   receive the digitized representation of the first condition and the second condition;
   detect an anomalous condition based on the first signal; and
   implement a protective action in response to the anomalous condition.

3. The shaft-mounted monitoring system of claim 2, wherein the anomalous condition comprises one of a locked rotor condition, an over-speed condition, and an under-speed condition.

4. The shaft-mounted monitoring system of claim 1, wherein the second sensor comprises a temperature sensor and the second condition comprises one of a temperature of the rotating shaft and an ambient temperature.

5. The shaft-mounted monitoring system of claim 1, wherein the second sensor comprises a strain sensor and the second condition comprises a torque on the rotating shaft.

6. The shaft-mounted monitoring system of claim 1, wherein the processor is further configured to generate a frequency domain representation of the first signal and to detect an anomalous vibration based on the frequency domain representation.

7. The shaft-mounted monitoring system of claim 6, wherein the processor is further configured to associate the anomalous vibration with an anomalous condition comprising one of a worn bearing, a broken bar, a shaft misalignment, and a load oscillation.

8. A shaft-mounted system configured to monitor a rotating shaft, the shaft-mounted system comprising:
   a housing configured to be coupled to the rotating shaft;
   a first sensor configured to be disposed within the housing, the first sensor further configured to output a first signal representative of a rotational component of the rotating shaft;
   a strain sensor configured to be disposed within the housing and configured to output a second signal representative of a torque on the rotating shaft;
   a processor in communication with the first sensor and the strain sensor, and configured to calculate a condition related to the rotational component based on the first signal and a torque of the rotating shaft based on the second signal;
   a wireless transmitter in communication with the processor and configured to transmit a digitized representation of the calculated condition and the torque to a consuming device; and
   a power supply in electrical communication with the first sensor and the strain sensor, the wireless transmitter, and the processor, and configured to supply electrical power to the first sensor, strain sensor, processor, and the wireless transmitter.

9. The shaft-mounted system of claim 8, wherein the first sensor comprises an accelerometer.

10. The shaft-mounted system of claim 9, wherein the condition comprises a rotational speed of the rotating shaft.

11. The shaft-mounted system of claim 9, wherein the condition comprises an angular position of the rotating shaft.

12. The shaft-mounted system of claim 9, wherein the accelerometer comprises at least a dual-axis accelerometer, and wherein one axis of the accelerometer is collinear with a radius of the rotating shaft.

13. The shaft-mounted system of claim 8, wherein the processor is further configured to determine a power transferred by rotating shaft based on the first condition and the torque.

14. The shaft-mounted system of claim 8, further comprising a filter configured to:
   receive an output of the first sensor;
   receive at least one criteria;
   assert an alarm based on a deviation of the output from the criteria by at least a threshold amount.

15. The shaft-mounted system of claim 14, wherein the at least one criteria comprises a target frequency.

16. The shaft-mounted system of claim 15, wherein the filter is further configured to receive a time window and the alarm is asserted based on the deviation existing for a period exceeding the time window.

17. A shaft-mounted system configured to monitor a rotating shaft, the shaft-mounted system comprising:
   a housing configured to be coupled to the rotating shaft;
   a first sensor configured to be disposed within the housing, the first sensor further configured to output a first signal representative of a rotational component of the rotating shaft;
   a second sensor configured to be disposed within the housing;
   wherein the second sensor comprises a thermal sensor configured to output a second signal representative of a temperature of the rotating shaft;

a processor in communication with the first sensor and the second sensor and configured to calculate a condition related to the rotational component based on the first signal and a temperature of the rotating shaft based on the second signal;

a wireless transmitter in communication with the processor and configured to transmit a digitized representation of the calculated condition related to the rotational component and the temperature to a consuming device; and a power supply in electrical communication with the first and second sensors, the wireless transmitter, and the processor, and configured to supply electrical power to the first and second sensors, processor, and the wireless transmitter.

18. The shaft-mounted system of claim 17, wherein the housing comprises a thermally conductive material and is in thermal communication with the shaft, and the second sensor is in thermal contact with the housing.

19. The shaft-mounted system of claim 17, further comprising a third sensor configured to determine an ambient temperature.

20. The shaft-mounted system of claim 17, further comprising a third sensor disposed along the length of the rotating shaft;

wherein the processor is further configured to extrapolate a temperature profile along the length of the rotating shaft based on temperature difference between the second sensor and the third sensor.

* * * * *